US009675908B2

(12) United States Patent
Pribanic et al.

(10) Patent No.: US 9,675,908 B2
(45) Date of Patent: Jun. 13, 2017

(54) FUEL FILTER ASSEMBLY AND CARTRIDGE

(71) Applicant: CLARCOR ENGINE MOBILE SOLUTIONS, LLC, Franklin, TN (US)

(72) Inventors: Justin R. Pribanic, Broad Brook, CT (US); Timothy M. Sasur, Newington, CT (US)

(73) Assignee: Clarcor Engine Mobile Solutions, LLC, Franklin, TN (US)

( * ) Notice: Subject to any disclaimer, the term of this patent is extended or adjusted under 35 U.S.C. 154(b) by 760 days.

(21) Appl. No.: 13/740,551

(22) Filed: Jan. 14, 2013

(65) Prior Publication Data

US 2014/0197087 A1 Jul. 17, 2014

(51) Int. Cl.
*B01D 27/08* (2006.01)
*B01D 35/30* (2006.01)

(52) U.S. Cl.
CPC ............ *B01D 27/08* (2013.01); *B01D 35/30* (2013.01); *B01D 2201/24* (2013.01); *B01D 2201/302* (2013.01)

(58) Field of Classification Search
None
See application file for complete search history.

(56) References Cited

U.S. PATENT DOCUMENTS

| | | |
|---|---|---|
| 3,399,776 A | 9/1968 | Knuth |
| 3,630,375 A | 12/1971 | Hodgkins |
| 4,052,307 A | 10/1977 | Humbert, Jr. |
| 4,126,557 A | 11/1978 | Hodgkins |
| 4,334,995 A | 6/1982 | Mahon |
| 4,491,120 A | 1/1985 | Hodgkins |
| 4,830,413 A | 5/1989 | Bisbing |
| 5,035,797 A | 7/1991 | Janik |
| 6,345,721 B1 | 2/2002 | Durre et al. |
| 6,645,376 B2 | 11/2003 | Marioni |
| 6,712,961 B2 * | 3/2004 | Chauquet ............ A01K 63/045 210/167.21 |
| 6,922,894 B2 | 8/2005 | Durre |
| 6,998,045 B2 | 2/2006 | Durre |

(Continued)

FOREIGN PATENT DOCUMENTS

WO    2008118939 A1    10/2008

OTHER PUBLICATIONS

International Search Report and Written Opinion dated Oct. 4, 2013 (PCT/US2013/021406).

(Continued)

*Primary Examiner* — Thomas M Lithgow
(74) *Attorney, Agent, or Firm* — Alix, Yale & Ristas, LLP

(57) ABSTRACT

A draw latch retainer is used to secure a filter cartridge to a filter head. A cam actuated retainer extends from the head to engage a keeper in the top of the cartridge. Rotation of the cam draws the retainer and cartridge axially toward the head into an installed position. The retainer extends through an aperture in the upper portion of the cartridge to apply a retention force against the bottom side of the keeper. The keeper and upper portion of the cartridge supporting the keeper are configured to transmit the retaining force laterally across the top of the cartridge. The keeper may be integral with a top plate enclosing an open end of the cartridge housing, or may be supported by the top plate.

14 Claims, 22 Drawing Sheets

(56) References Cited

U.S. PATENT DOCUMENTS

| | | |
|---|---|---|
| 7,303,673 B1 | 12/2007 | Glazewski |
| 7,651,070 B2 | 1/2010 | Ruprecht |
| 7,850,755 B2 | 12/2010 | Krull et al. |
| 8,043,503 B2 | 10/2011 | Clausen |
| 2001/0045385 A1 | 11/2001 | Janik et al. |
| 2002/0125188 A1 | 9/2002 | Hacker et al. |
| 2004/0154975 A1 | 8/2004 | Girondi |
| 2009/0078626 A1 | 3/2009 | Krull et al. |

OTHER PUBLICATIONS

Supplementary European Search Report dated Jul. 20, 2016 (European Patent Application No. 13870515.7.).

* cited by examiner

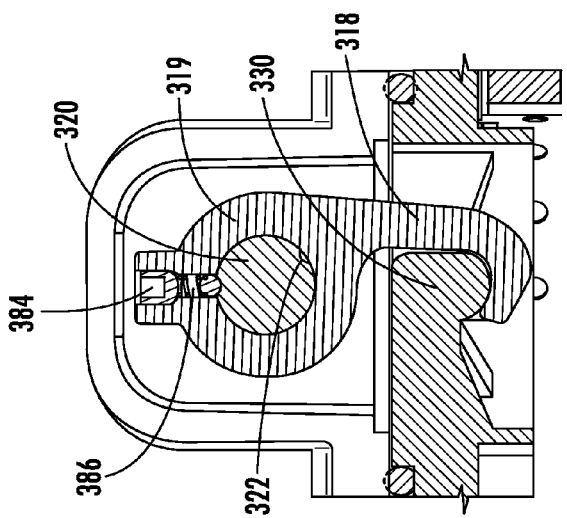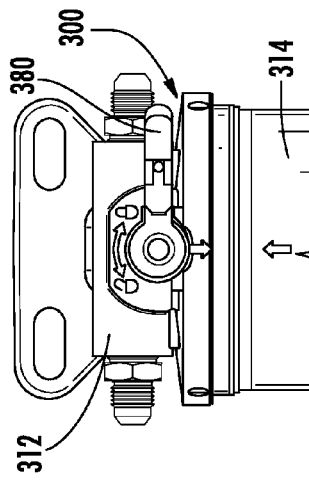
FIG. 24A  FIG. 24B
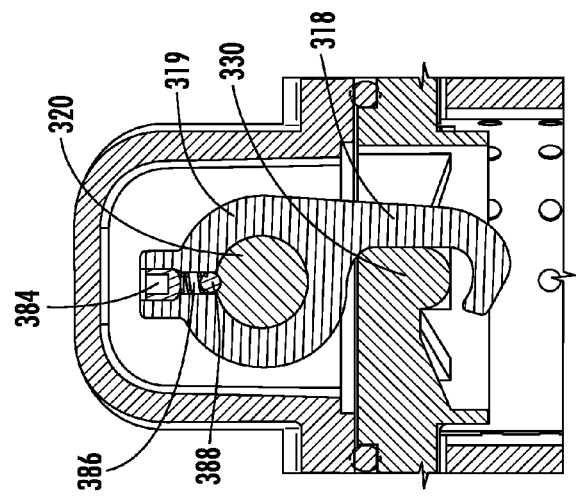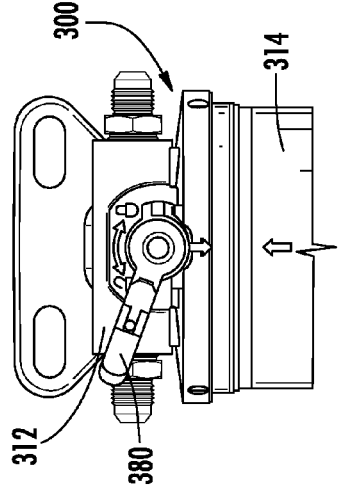
FIG. 25A  FIG. 25B
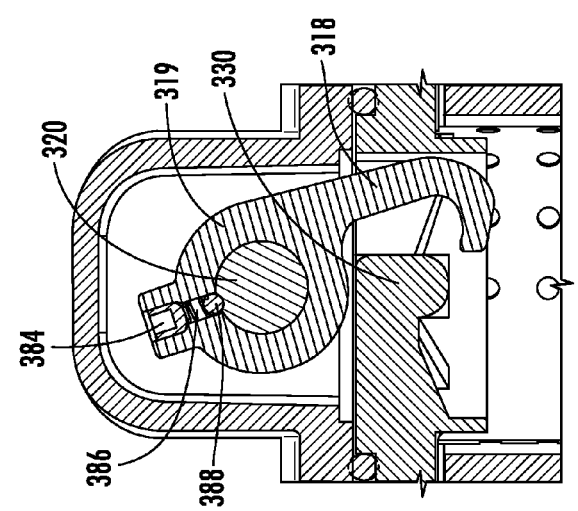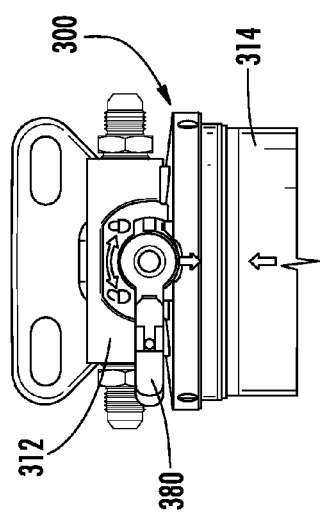
FIG. 26A  FIG. 26B

FUEL FILTER ASSEMBLY AND CARTRIDGE

BACKGROUND

The present disclosure relates to filter assemblies used to filter fluids and in particular to novel methods and mechanisms for securing a replaceable filter cartridge to a filter head connected to a fluid delivery system.

Filter assemblies are commonly used to filter fuel, lubricants and hydraulic fluids in on road and off road vehicles and equipment. Such filter assemblies typically include a permanently installed head or base module in communication with a fluid delivery or flow system. The head or base module provides an interface between the fluid delivery or flow system and a replaceable filter element. The filter element may be contained in a re-useable housing or may take the form of a replaceable filter cartridge which includes a housing that is disposed with the spent element. In either case, the head or base module includes structures for securing the replaceable element to the head so that fluid is routed through a filter media to remove particulates and/or contaminants such as water.

Fluid filters must be changed at regular intervals to ensure reliable performance and service life of the vehicle or equipment. Exchange of fluid filters may be performed in a service bay or garage, but frequently happens in the field for agricultural, mining and similar equipment. Ease of replacement can be an important factor in filter assembly design. Many methods are used to secure the replaceable filter element to the filter head or base. Threaded rods may extend through the filter housing and element to hold the element and housing in sealed engagement with the filter head. So called "spin on" filters include an axial aperture having a threaded inside surface which engages a threaded conduit extending from the filter head. Various bayonet attachments have been used, such as that described in U.S. Pat. No. 6,187,188, assigned to the assignee of the present disclosure. The spin on and bayonet attachments require the filter cartridge or housing to rotate relative to the filter head. Such relative movement can be problematic when the filter assembly is in a crowded environment.

Exchange of fluid filters also can result in release of fluid from the cartridge and/or fluid system, so some filter assemblies may include a shut off valve to close at least the fluid passage leading to the cartridge or element during replacement. Ideally, the filter element or cartridge can be removed and a new element or cartridge installed with minimal equipment or tools.

There is a need for a filter assembly where the replaceable component can be easily exchanged with minimal tools in a crowded or obstructed environment. There is also a need for a filter assembly where the replaceable component can be exchanged with a reduced chance that fluid from the system is released into the environment.

SUMMARY OF THE INVENTION

A draw latch retainer is used to secure a filter cartridge to a filter head. A cam actuated retainer extends from the head to engage a keeper in the top of the cartridge. Rotation of the cam draws the retainer and cartridge axially toward the head into an installed position. The retainer extends through an aperture in the upper portion of the cartridge to apply a retention force against the bottom side of the keeper (the side of the keeper facing a cavity defined by the cartridge housing). The keeper and upper portion of the cartridge supporting the keeper are configured to transmit the retaining force laterally across the top of the cartridge. The keeper may be integral with a top plate enclosing an open end of the cartridge housing, or may be supported by the top plate. This application will use the term "keeper" to refer to the portion or portions of the cartridge that receive the retention force from a retainer extending from the head. The term "keeper" for purposes of this application is a structure on or adjacent a longitudinal axis of the claimed filter cartridge for receiving retention force to secure the cartridge to a head.

According to aspects of the disclosure, the cam is operatively connected to a valve which shuts off fluid flow to the cartridge when the cam and retainer are rotated to the "released" position to prevent release of fluid into the environment during the exchange of a used cartridge for a new one. The cam and valve extend to a driven end accessible from outside the filter assembly. A tool applied to the driven end rotates the cam and valve between a "mounted" position where the valve is open and the retainer is axially withdrawn into the head, applying retaining force against the keeper and a "released" position where the valve is "off" and the retainer is axially extended from the head, releasing the cartridge. A tool-less design may incorporate a lever or other hand operated closure mechanism. The fluid shut off valve is optional and may be applied to the fluid inlet, outlet or both.

The retainer may take many forms, but will include some portion that will engage the keeper. The retainer may take the form of a hook extending through an aperture and beneath a keeper. Alternatively, the retainer may take the form of a "T" shape, with laterally projecting shoulders extending through a slot-shaped aperture and beneath keeper portions disposed to either side of the slot. The retainer and keeper have complimentary configurations for positive engagement between the head and cartridge and so that retaining force applied to the keeper is spread across the cartridge away from the point of retainer/keeper contact.

Keys may extend from the top surface of the cartridge and interfit with corresponding recesses in the head to aid in alignment of the cartridge relative to the head. Alignment is necessary to ensure accurate registration of fluid flow openings defined by the head and cartridge when the cartridge is mounted to the head. Proper alignment is also important to ensure that the cartridge is sealed to the head to prevent unintentional release of fluid into the environment. Keys and recesses may also be used to code a head for a particular cartridge to ensure replacement with a cartridge compatible with the requirements of a given fluid flow system. An incorrectly keyed cartridge cannot be properly mounted to the base.

BRIEF DESCRIPTION OF THE DRAWINGS

FIG. 24a is an enlarged partial sectional view through an embodiment of a disclosed filter assembly showing the eccentric/retainer interface and the released position of the retainer relative to the cartridge and keeper;

FIG. 24b is an exterior plan view of the filter assembly of FIG. 24a showing the release/engagement lever position corresponding to the released position shown in FIG. 24a;

FIG. 25a is an enlarged partial sectional view through the embodiment of a filter assembly of FIG. 24a showing the eccentric/retainer interface and the position of the retainer relative to the cartridge and keeper when the retainer is moving from the released position of FIG. 24a toward a retained position shown in FIG. 26a;

FIG. 25b is an exterior view of the filter assembly of FIG. 25a showing the release/engagement lever position corresponding to the transitional position of FIG. 25a;

FIG. 26a is an enlarged partial sectional view through the filter assembly of FIG. 24a showing the eccentric/retainer interface and the retained position of the retainer relative to the cartridge and keeper;

FIG. 26b is an exterior view of the filter assembly of FIG. 26a showing the release/engagement lever position corresponding to the retained position shown in FIG. 26a;

DETAILED DESCRIPTION

Figure 1:
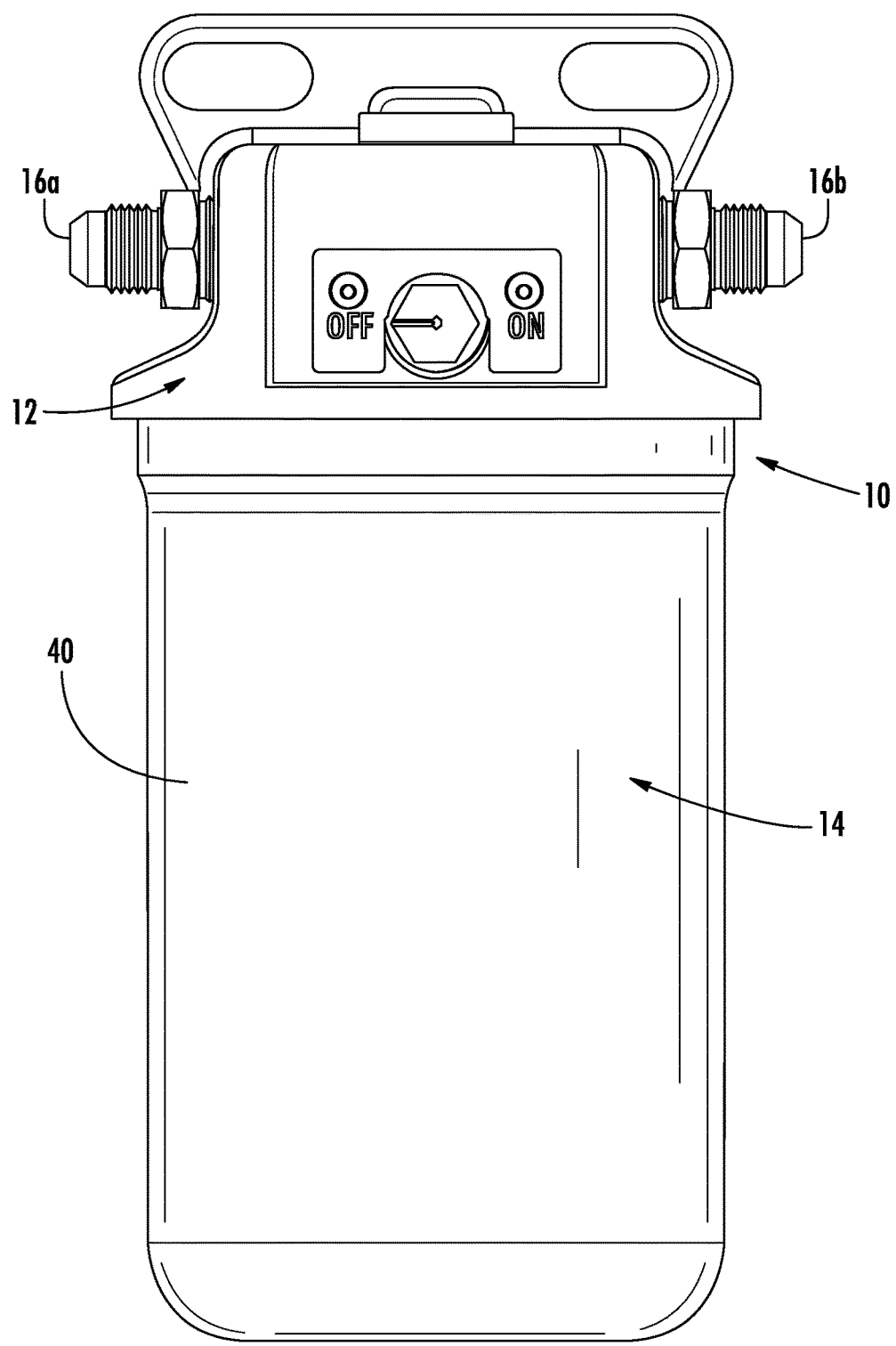
FIG. 1 is a front elevation view of an embodiment of a filter assembly according to aspects of the disclosure.

Embodiments of a filter assembly and cartridge will be described with reference to the drawings, in which common reference numerals refer to similar components.

Figure 2:
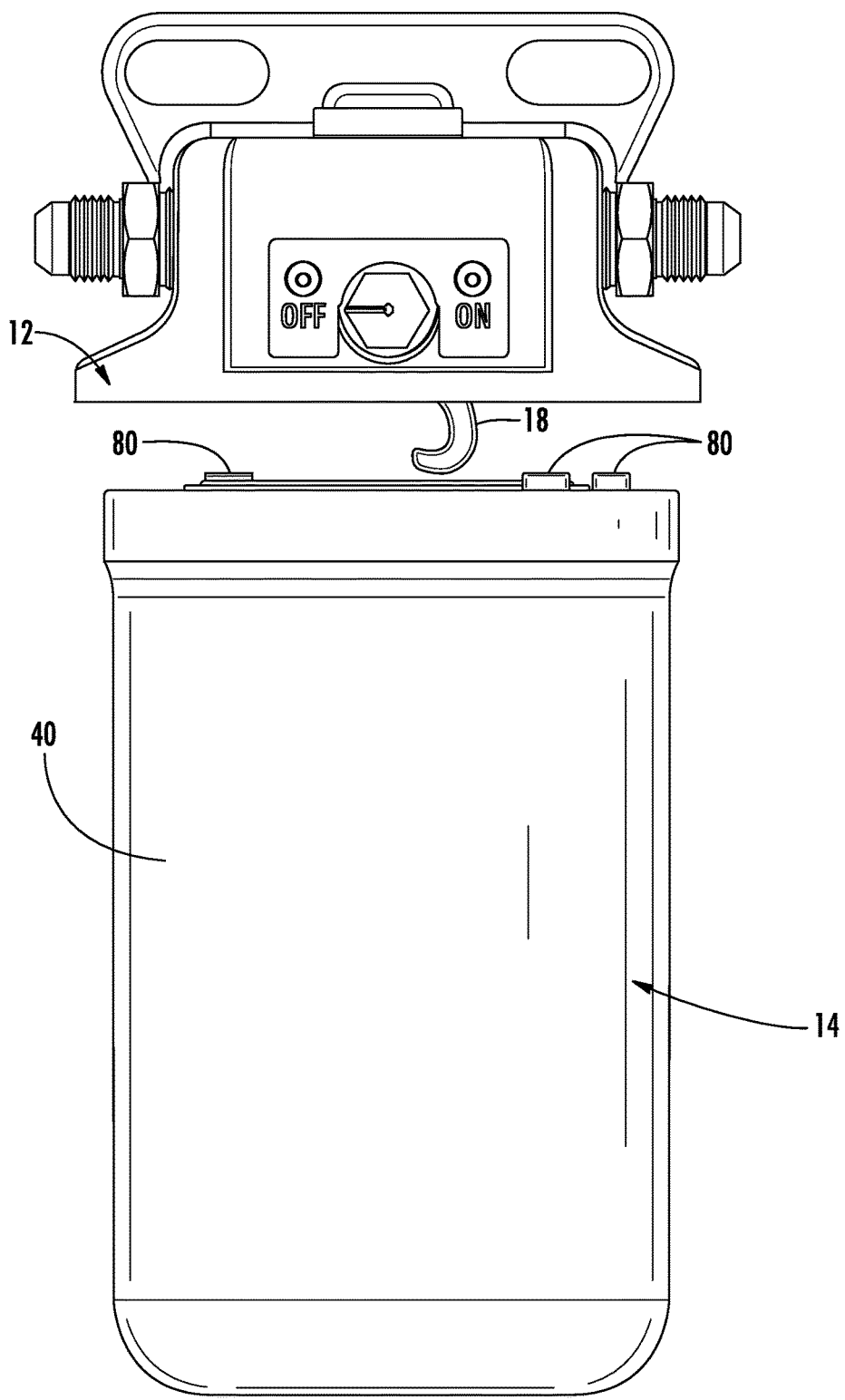
FIG. 2 is a front elevation view of the filter assembly of FIG. 1, with the cartridge separated from the head.
Figure 3:
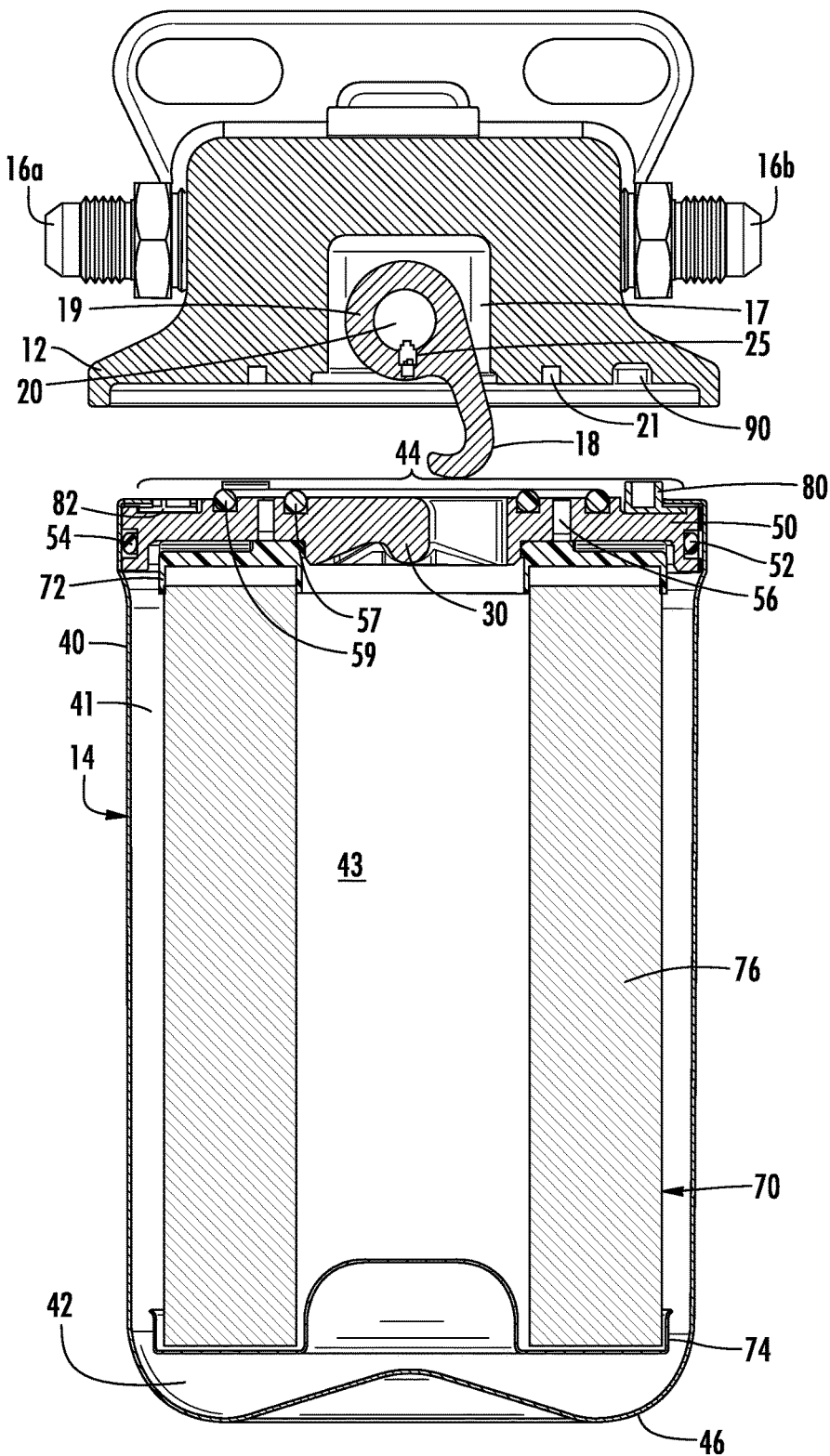
FIG. 3 is a sectional view of the filter assembly of FIG. 2.
Figure 4:
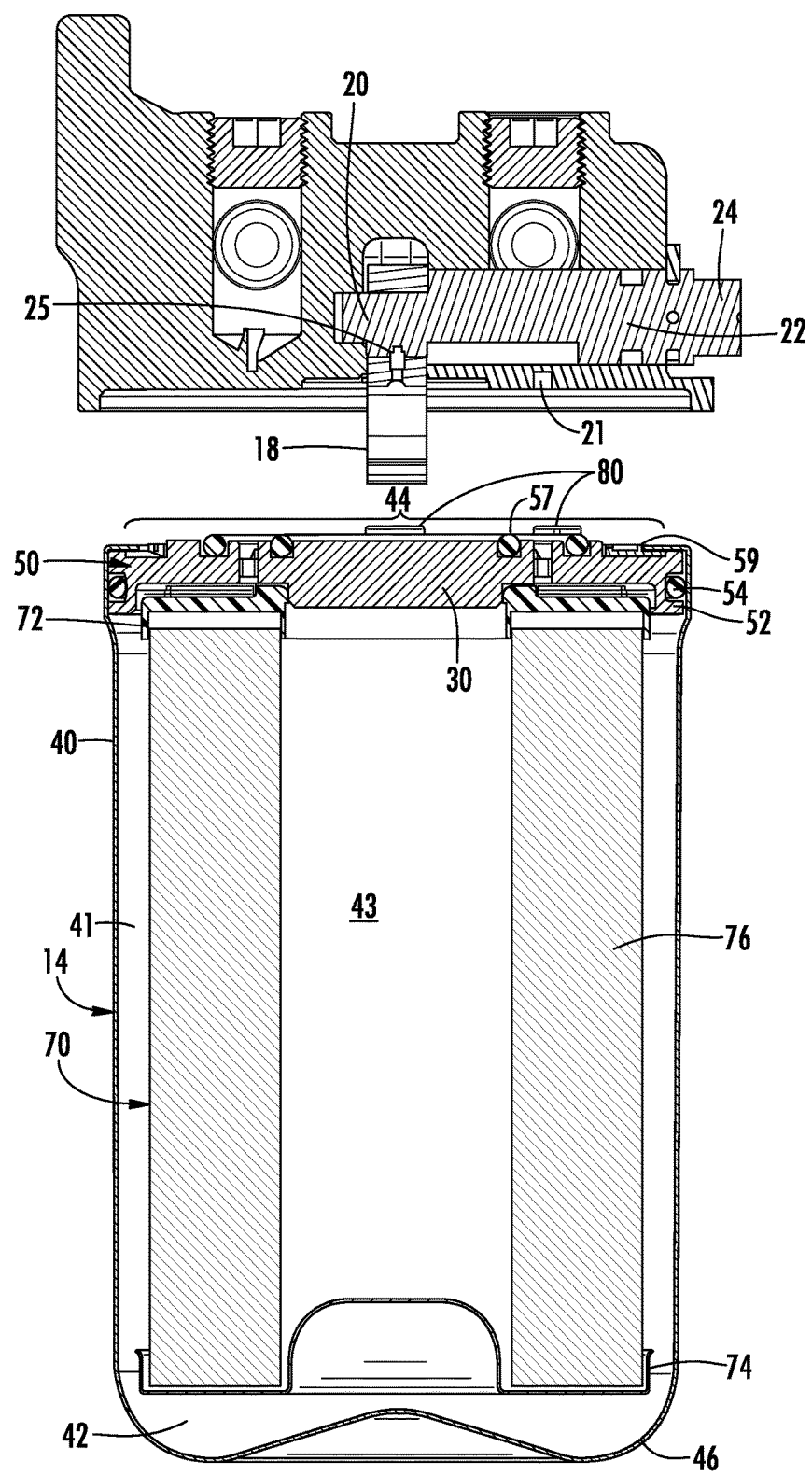
FIG. 4 is a sectional view of the filter assembly of FIG. 2, taken perpendicular the sectional view of FIG. 3.
Figure 5:
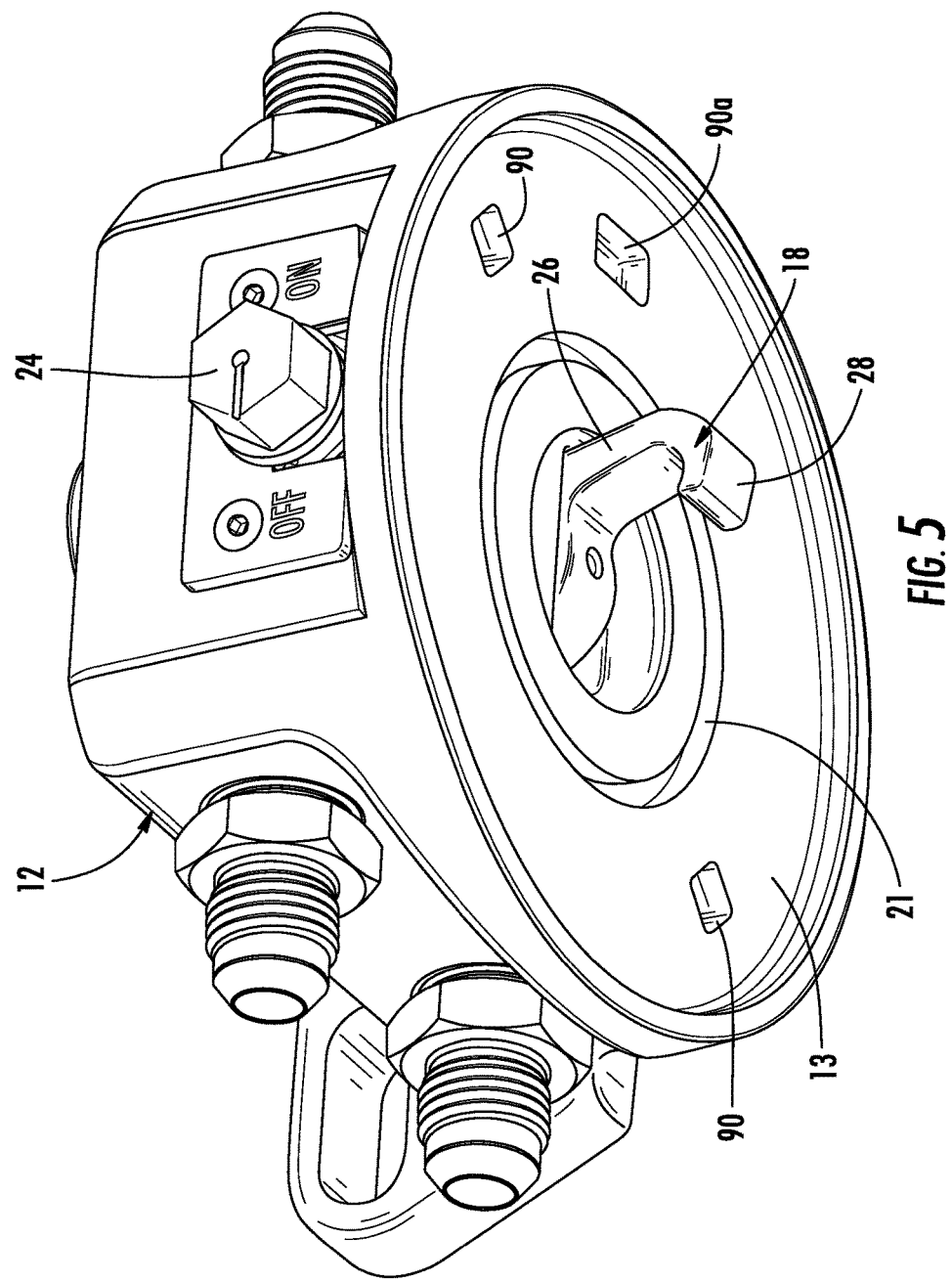
FIG. 5 is a bottom perspective view of the filter head of the filter assembly of FIG. 1.
Figure 6:
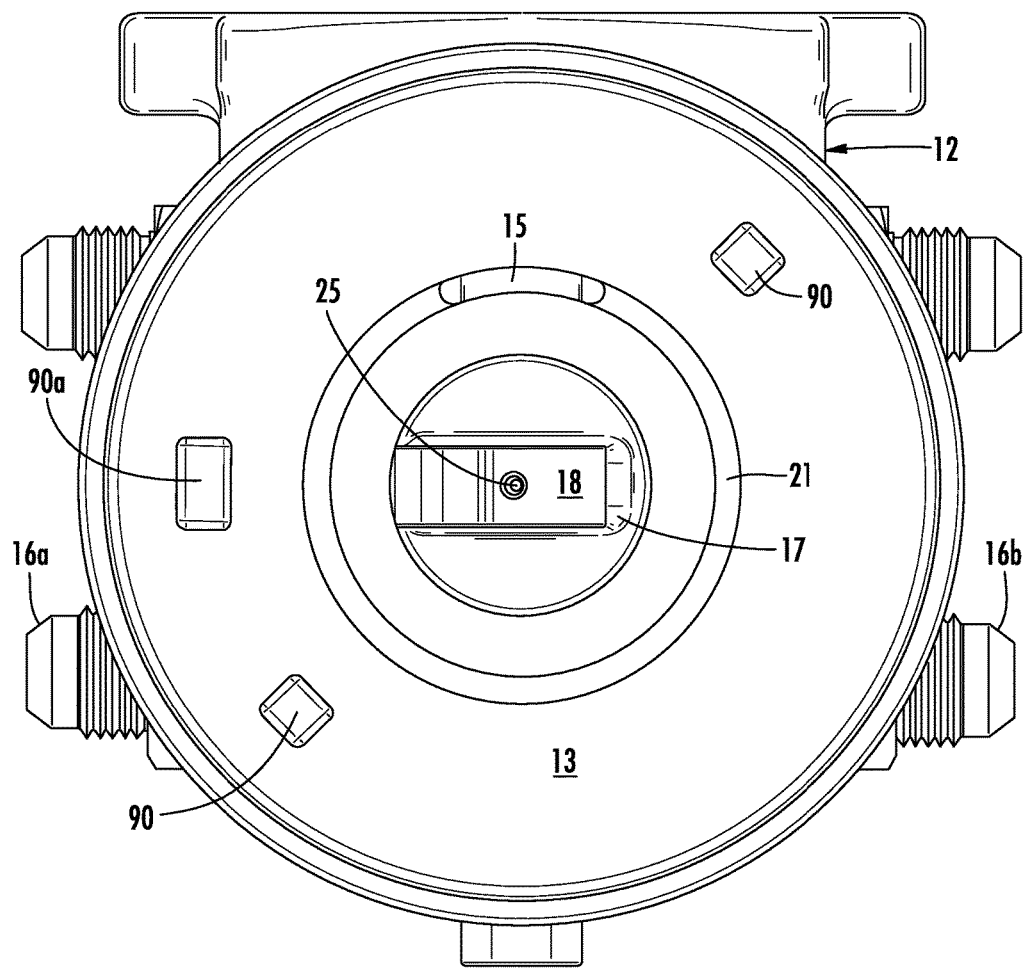
FIG. 6 is a bottom plan view of the filter head of the filter assembly of FIG. 1.
Figure 7:
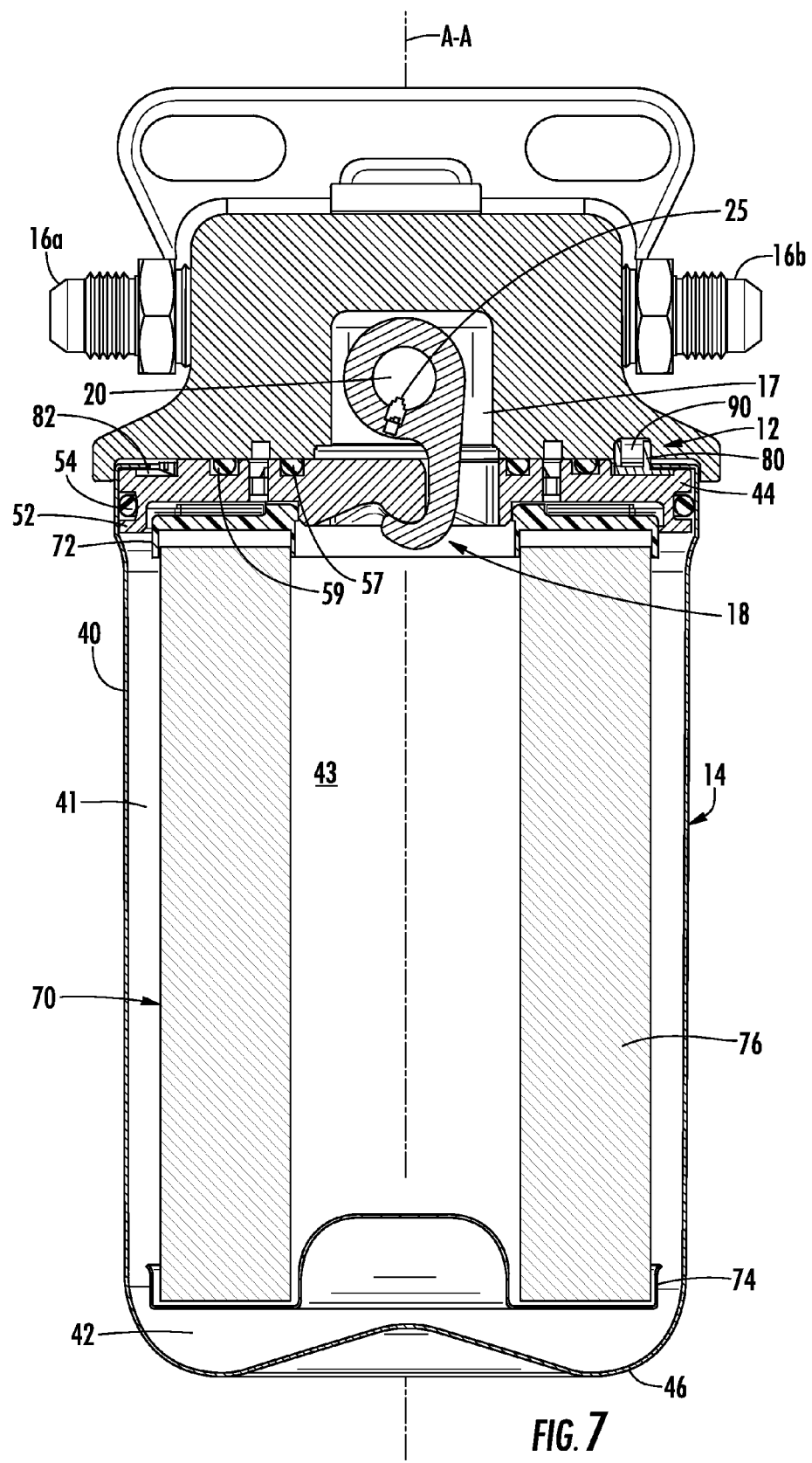
FIG. 7 is a sectional view of the filter assembly of FIG. 1, with the cartridge retained to the head.
Figure 8:
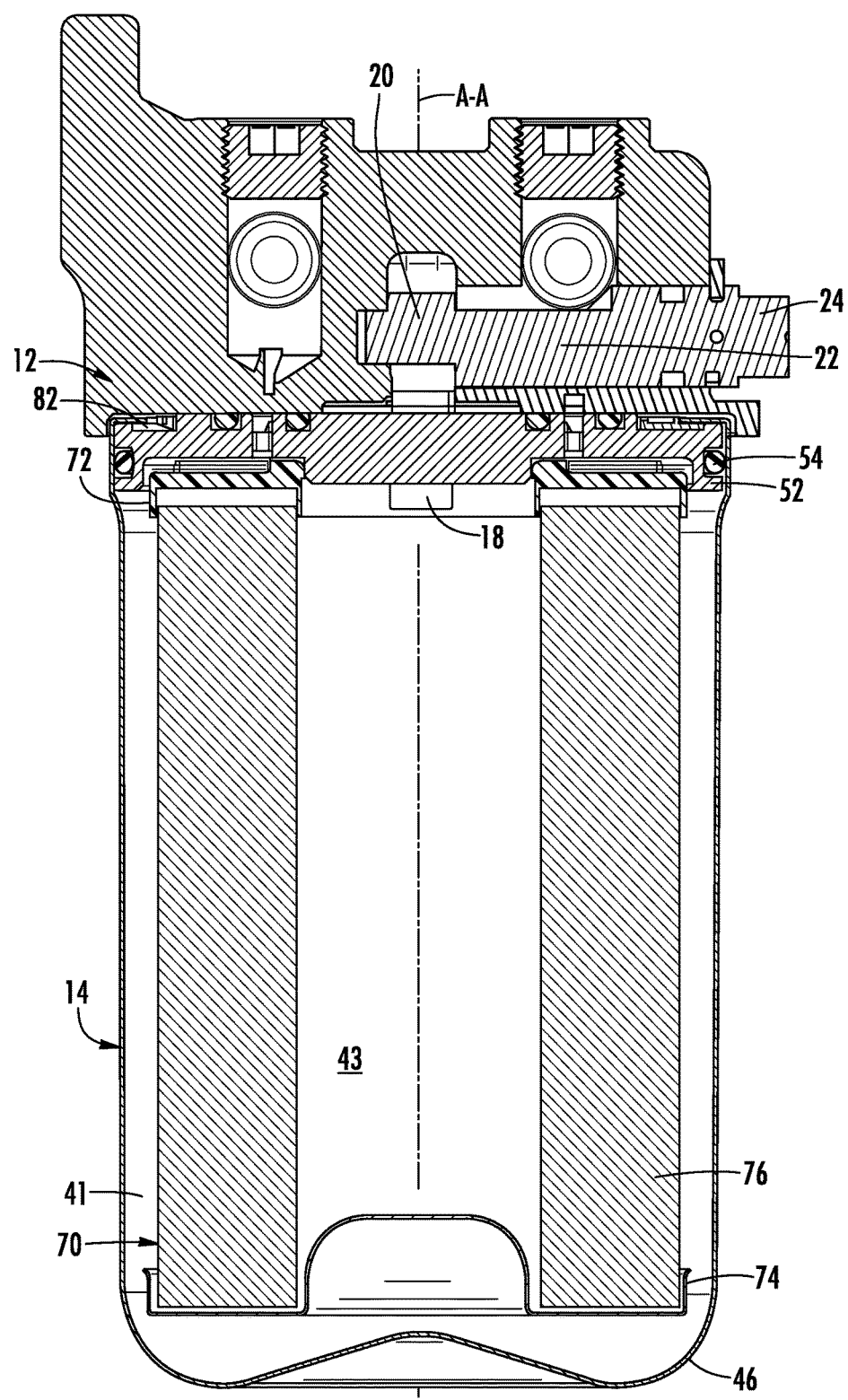
FIG. 8 is a sectional view of the filter assembly of FIG. 1, with the cartridge retained to the head and taken perpendicular to the sectional view of FIG. 7.

A first embodiment of a filter assembly 10 according to aspects of the disclosure is shown in FIGS. 1-11. The filter assembly 10 includes a filter head 12 and a replaceable filter cartridge 14. The filter head 12 includes conduits 16a, 16b for connection to a fluid system, such as the fuel delivery system in a diesel-powered on road or off road vehicle or equipment. The filter head 12 also includes an interface for mounting the replaceable cartridge which defines fluid flow openings that communicate fluid to and from a mounted cartridge 14. The disclosed filter head 12 supports a cam-actuated hook 18 configured to engage and retain the filter cartridge 14. The cam 20 (which may also be described as an eccentric) is mounted for rotation within the head and is coupled to a valve 22 which controls fluid flow to and/or from the head 12 to the cartridge 14. In the embodiment illustrated in FIGS. 1-11, the cam and valve are formed on a common shaft, as best seen in FIGS. 4 and 8. The shaft terminates at a driven end 24 extending outside the head 12 for manipulation by a tool. FIGS. 1, 2 and 5 show a hex head on the driven end 24, but any drive shape on the driven end 24 is acceptable, so long as there is sufficient space in the installed environment for a tool to rotate the shaft. Rotation of the shaft in a first direction (clockwise, to secure the cartridge to the head) opens the flow control valve 22 and rotation of the shaft in a second direction (counterclockwise, to dismount the cartridge from the head) closes the flow control valve 22 as shown in FIGS. 8 and 4, respectively. The flow control valve 22 may be associated with the fluid inlet, the fluid outlet, or both. This configuration helps prevent release of the fluid being filtered into the environment during exchange of filter cartridges.

The cam-actuated retainer may take many forms, but the disclosed embodiments will share some attributes of the hook 18. For example, the retainer needs to engage a cam such that rotation of the cam in a first direction withdraws the retainer into the head, while rotation of the cam in a second direction (or continued rotation in a first direction, as will occur to those skilled in the art) extends the retainer from the head. The retainer includes an arm that extends from engagement with the cam to an opposite end configured to engage the cartridge. In the disclosed embodiments, the retainer includes at least one projection extending laterally from the arm beneath a keeper at one end of the cartridge. The lateral projection may take the form of a hook, shoulder, or the like.

In the disclosed embodiments, the cam 20 is located at or near a longitudinal axis A-A extending through the head 12 and cartridge 14 and configured to generate movement of the hook 18 in an axial direction toward and away from the head 12 to secure and release the cartridge 14, respectively. The cam 20 and associated hook 18 in the disclosed embodiments are configured to require less than a full rotation)

(360° of the drive to engage or disengage the cartridge from the head. In the disclosed embodiments, ½ turn or 180° rotation of the shaft releases or retains the filter cartridge 14 from the head 12. One disclosed embodiment of a cam-actuated hook is illustrated in FIGS. 2-8. In this embodiment, the hook 18 has a single arm 26 extending from the cam 20 to a curved finger 28 configured to engage a keeper 30 supported at or near one end of the cartridge 14. As shown in FIG. 7, the arm 26 is offset from the longitudinal axis A-A, while the keeper 30 is located on the longitudinal axis A-A and retention force is applied to the cartridge 14 generally along the longitudinal axis A-A. The hook 18 includes an eye 19 surrounding the cam 20 and frictionally engaged to the cam. The hook 18 pivots through an arc of approximately 20° from the "retained" position aligned with the longitudinal axis A-A as shown in FIG. 7 and a "released" position pivoted away from the longitudinal axis A-A as shown in FIG. 3. The eye 19 of the hook is frictionally engaged with the cam 20 so that rotational movement of the cam 20 is transmitted to the hook 18 to pivot the hook 18 between the retained and released positions, while relative movement is permitted between the eye 19 of the hook 18 and the cam 20 so the cam and associated valve can complete rotation to their final "ON" and "OFF" positions shown best in FIGS. 8 and 4, respectively. Frictional engagement between the eye 19 of the hook 18 and the cam 20 in this embodiment is accomplished with a soft tipped set screw 25.

The cartridge 14 includes a housing 40 which defines an interior cavity 42. In the embodiment of FIGS. 1-11, the cartridge housing 40 is a deep-drawn steel "can" as is known in the art. The configuration of the housing 40 is not limited to the disclosed steel can and other forms of housing compatible with the disclosed embodiments may occur to those skilled in the art. The housing 40 has an open end 44 and a closed end 46, though in some embodiments, the closed end 46 may define a drain for removal of water separated from fuel passing through the cartridge as is known in the art. A plate 50 is engaged with the open end 44 of the housing 40 to enclose the interior cavity 42. The plate 50 includes an annular peripheral groove 52 and associated O-ring seal 54 compressed between the peripheral edge of the plate 50 and an inside surface of the housing 40. Other forms of sealed connection between the plate 50 and the housing 40 will occur to those skilled in the art depending upon the structure and materials used for the filter cartridge. The plate supports a "keeper" 30 which is engaged by the hook 18 (or other retainer) to retain the cartridge 14 to the head 12.

This application will use the term "keeper" to refer to the portion or portions of the cartridge that receive the retention force from the cam-actuated hook 18 or other retainer extending from the head 12. The term "keeper" for purposes of this application is a structure on or adjacent a longitudinal axis A-A of the claimed filter cartridge for receiving retention force to secure the cartridge 14 to a head 12. The disclosed proximity of the keeper to a longitudinal axis is not meant to imply or require that the cartridge is symmetrical about the axis, or that the keeper and/or retainer be aligned with the axis. However, since the retention force applied to the keeper is the only retention force attaching the cartridge to the head, it will be appreciated that a keeper on or adjacent to the center of the cartridge will balance forces applied to the cartridge relative to the head. The keeper 30 is supported by, but not necessarily integral with, the top plate 50 of the filter cartridge 14 and configured to be engaged by a retainer extending from a filter head 12. The top plate 50 and support for the keeper 30 are sufficiently rigid and robust that retention force on the keeper is transmitted laterally across the top plate.

In the disclosed embodiment of FIGS. 1-11, filter element 70 is arranged in the housing 40 to separate the cavity 42 into an unfiltered region 41 adjacent the housing side wall and a filtered or clean region 43 adjacent the longitudinal axis A-A. The filter element 70 may include first (upper) and second (lower) end caps 72, 74 and filter media 76 secured to the upper and lower end caps 72, 74 such that fluid must pass through the media 76 to pass between the unfiltered and filtered regions 41, 43. In the disclosed embodiments, fluid enters the cartridge 14 via an array of fluid inlet openings 56 defined in the plate 50 and is directed into the unfiltered region 41. Fluid flows from the unfiltered region 41 to the filtered region 43 through the filter media 76, where particulates and at least some entrained water are removed. Filtered (clean) fluid then exits the filter cartridge axially via an array of fluid outlet openings 58 defined by the plate 50. As best seen in FIGS. 3, 4, and 7-9 the plate 50 has a top surface which defines concentric grooves 57, 59 centered on the longitudinal axis A-A. Each groove 57, 59 carries an O-ring seal arranged to compress and seal against a bottom surface 13 of the filter head 12 to separate the fluid inlet 56 and outlet 58 openings from each other to define a fluid flow path through the cartridge 14 from the unfiltered/dirty (peripheral) region 41 to the filtered/clean (central) region 43.

In the disclosed embodiment of FIGS. 1-11, the fluid inlet openings 56 are arranged in a circular array concentric with and radially outward of an array of fluid outlet openings 58 adjacent said longitudinal axis A-A. The bottom surface 13 of the head defines a fluid outlet 15 above and radially aligned with the array of fluid inlet openings 56 on the top plate 50 of the cartridge 14. The fluid outlet 15 in the head 12 is aligned with a circular channel 21 configured to allow unfiltered fuel to flow around the top of the cartridge 14 and enter any of the fluid inlet openings 56. The disclosed head 12 also defines at least one centrally located fluid flow opening 17 generally aligned and in fluid communication with the fluid outlet openings 58 in the plate 50.

Figure 9:
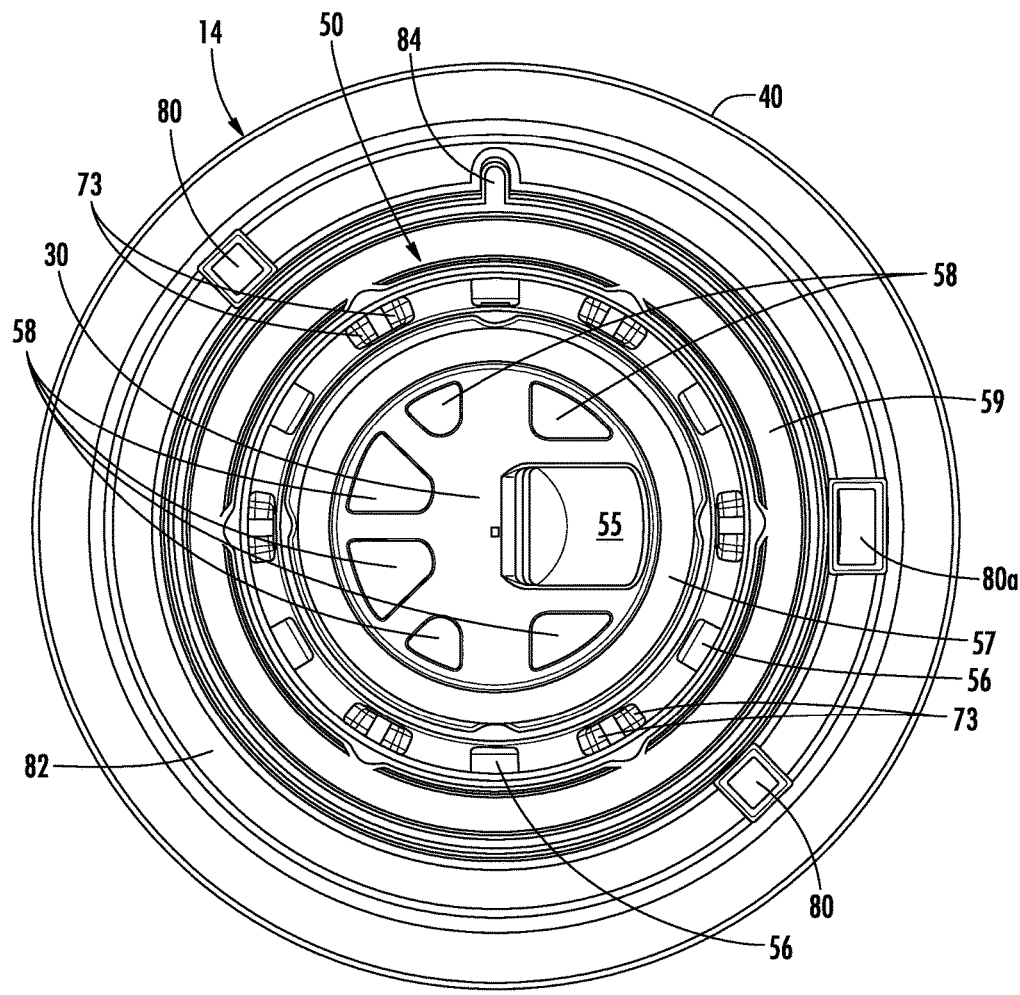
FIG. 9 is a top plan view of the filter cartridge of the filter assembly of FIG. 1.
Figure 10:
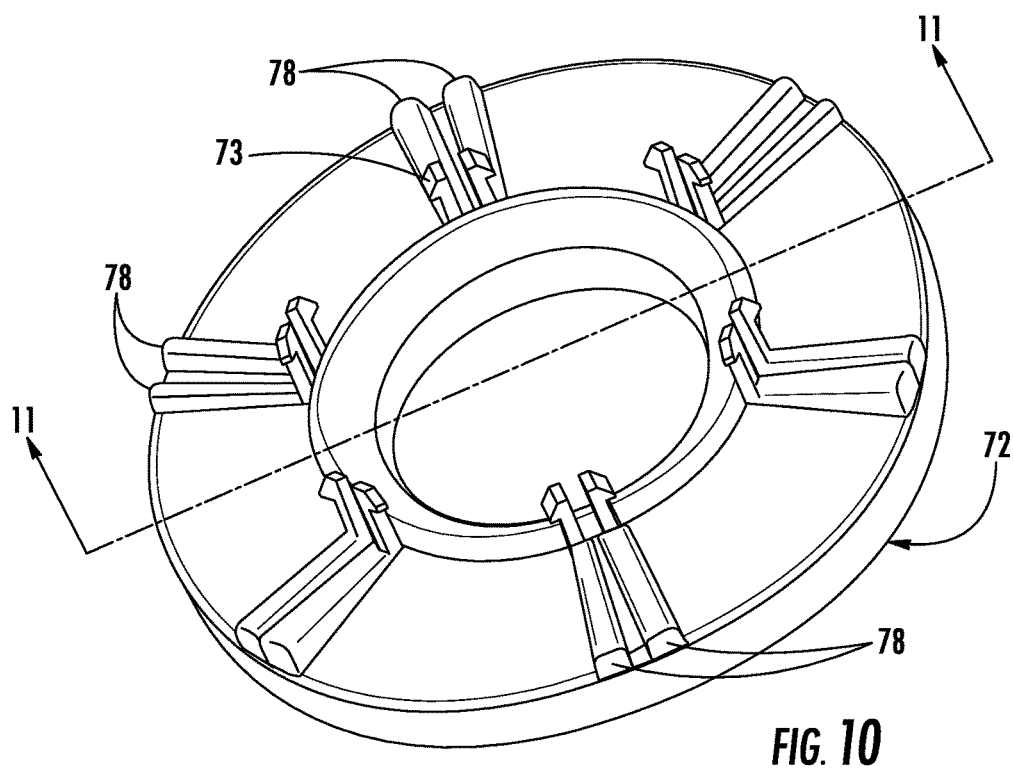
FIG. 10 is a perspective view of a first (upper) end cap of a filter element compatible with the filter assembly of FIGS. 1-9.
Figure 11:
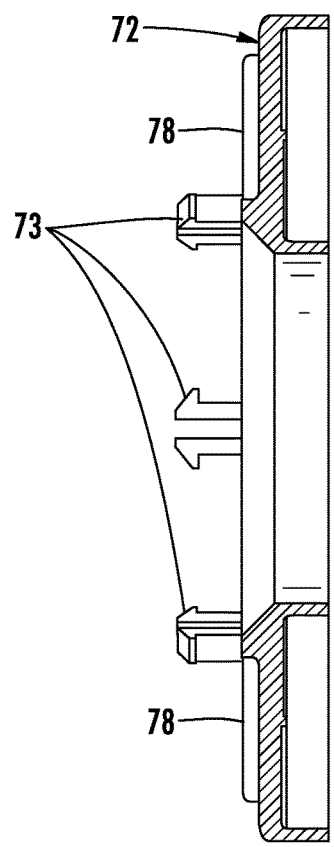
FIG. 11 is a sectional view of the end cap of FIG. 10, taken along line 11-11 thereof.

As shown in FIGS. 10 and 11, in the embodiment of FIGS. 1-9 the upper end cap 72 includes snap fingers 73 configured to engage at least some of the fluid inlet openings 56 defined by the plate 50. The snap fingers 73 include barbs that spread apart to engage the top side of the plate 50 to maintain the filter element 70 in a pre-determined position within the cavity 42. The filter element of FIGS. 3, 4, 7, and 8 includes a first (upper) end cap 72 and a second (lower) end cap 74. Filter media 76 in the form of a pleated cylinder extends between and is attached to the first and second end caps 72, 74. The attachment between the filter media 76 and the end caps 72, 74 may take the form of potting material as is known in the art. Other means of attaching the filter media 76 to the end caps 72, 74 and top plate 50 may be compatible with the disclosed filter assembly 10, so long as an effective seal is formed between the media 76 and the end caps 72, 74 to separate the unfiltered and filtered regions of the cartridge 14. The upper end cap 72 includes radially extending ribs 78 which maintain a fluid flow space between the bottom surface of the plate 50 and the top surface of the upper end cap 72. Fuel entering the cartridge 14 flows radially outwardly across the upper end cap 72 and into the unfiltered (peripheral) region 41 of the cartridge 14.

As shown in FIGS. 3, 7, and 9 the end plate 50 of the cartridge includes a keeper 30 arranged on the axis A-A of the cartridge 14. A retainer-receiving aperture 55 is defined by the plate 50 adjacent the keeper 30. The aperture 55 is large enough to admit the hook 18 in a position pivoted away from the keeper as shown in FIG. 3. The upper end of the hook 18 defines an eye 19 to receive the cam 20. Rotation of the cam 20 in a first direction (counter clockwise) causes the hook 18 to extend axially from the head 12 and pivot away from the longitudinal axis A-A of the cartridge 14 (FIG. 3). Rotation of the cam 20 in a second direction (clockwise) causes the hook 18 to pivot toward the longitudinal axis A-A of the cartridge 14 and retract axially toward the head 12 (FIG. 7). As shown in FIGS. 1, 2, and 5, the driven end 24 of the cam includes a hex head for manipulation by a suitable tool, which may include an open end, box end or socket wrench. Other driven end configurations, such as openings configured to receive Allen, Torx, etc. tools are compatible with the disclosed embodiments. Tool-less embodiments may employ a lever, knob or other hand-operated mechanism. See FIGS. 20 through 26, described below.

The keeper 30 shown in FIGS. 3, 4 and 7-9, is formed on a bar that spans the central region of the plate 50. In this embodiment, the retainer-receiving aperture 55 communicates with the clean (central) region 43 of the filter cartridge 14 and permits fluid to flow out of the cartridge 14 around the hook 18 and into fluid flow passage 17 in the head, which returns filtered fuel to the fuel delivery system via conduits 16*a* or 16*b*. However, the retainer receiving aperture 55 need not communicate with the fluid flow paths defined by the assembly and may be closed off from the fluid flow paths. In the disclosed embodiment, the filter head 12 defines a fluid flow passage 17 surrounding the hook 18 and in communication with the fluid outlets 58 defined by the plate 50. In this cartridge/head assembly 10, the cartridge 14 is retained to the head 12 by a retaining force applied to the plate 50 by the hook 18 (or other retainer). The retaining force is applied to the second side of the plate 50, e.g., the side of the plate facing the cartridge cavity 42. The retaining force is essentially an axial force toward the head 12. The retainer receiving aperture 55 is configured to allow the hook 18 (or other retainer) to pass through the plate 50 and contact the keeper 30 on the second side of the plate 50. The retainer receiving aperture 55 plays no role in attachment of the cartridge 14 to the head 12, other than permitting passage of the hook 18 (or other retainer) through the plate 50 to contact the keeper 30.

In the disclosed embodiment, the plate 50 may be a die cast metal part. Other materials and methods of manufacture may be compatible with the disclosed embodiments, however the plate 50 must support the keeper 30 with enough strength that the cartridge 14 is secured to the head 12 against internal pressure, vibration and shock present in the use environment. In the embodiment of FIGS. 1-9, the keeper 30 is integral with the plate 50 and is connected to the plate 50 by several webs of plate material, in addition to the bar of which it is a part. As shown in FIGS. 3 and 7, the keeper 30 has a convex, rounded shape in cross section, which matches the curvature of the inside surface of the hook 18. This configuration spreads the retention force applied to the keeper 30 over a large area of the plate to reduce peak stresses in the plate 50.

It will be apparent to those skilled in the art that the cartridge 14 must be properly oriented and aligned relative to the head for the hook 18 to pass through the retainer receiving aperture 55 and engage the keeper 30. To assist in orientation and alignment of the cartridge 14 relative to the head 12, the top end of the cartridge embodiment illustrated in FIGS. 1-4 and 7-9 includes raised keys 80 that correspond to complementary recesses 90 defined in the bottom surface 13 of the head 12 as shown in FIGS. 5 and 6. In a cartridge having the correct number, configuration and placement of keys 80 for a given head, the keys 80 are received in the corresponding recesses 90 as shown in FIG. 7, which properly align the cartridge 14 with the head 12 so that the hook 18 passes through the aperture 55 and over the keeper 30. The keys 80 also align the O-ring seals and arrays of fluid flow openings 56, 58 on the top of the cartridge 14 with the corresponding fluid flow openings 15, 17 on the bottom surface 13 of the filter head 12. Once aligned with the head 12 and inserted upwardly with the keys 80 received in the recesses 90, the cam 20 is rotated clockwise, pivoting the hook 18 into position under the keeper 30 and drawing the hook 18 axially toward the head 12. The hook 18 engages the keeper 30 to compress the O-ring seals carried by the cartridge against the head. Rotation of the cam 20 from the "OFF" position to the "ON" position opens the associated fluid flow valve(s) to permit fluid communication from the vehicle fuel system through the fuel filter assembly 10.

Figure 32:
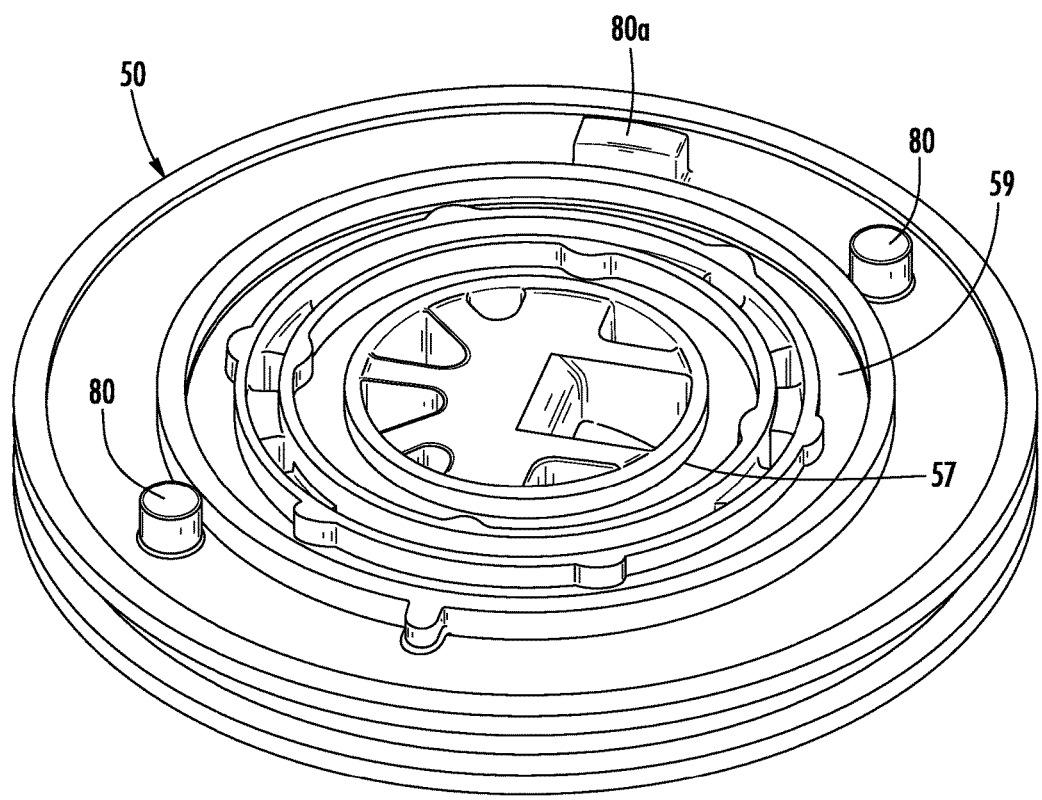
FIG. 32 is a perspective view of a plate for a filter cartridge having cast key and indexing features according to aspects of the disclosure.

If the arrangement of keys 80 on the top of the filter cartridge 14 is not compatible with the pattern of recesses 90 in the filter head 12, then the cartridge 14 will not be received in the head 12 far enough to allow the hook 18 to engage the keeper 30. The keys 80 and recesses 90 serve as alignment points for ensuring proper installation of the cartridge 14 to the base 12. The keys 80 also serve as a code to match cartridges having the correct filtration, fluid handling and pressure tolerance for a given application with a base keyed for cartridges with those properties. As best seen in FIGS. 3, 4 and 7-9, the keys 80 may be carried on a key ring 82 which is trapped against the top surface of the plate 50 by the formed upper edge of the housing 40. The plate 50 may include a protrusion or feature 84 (as shown in FIG. 9) to index the key ring 82 to the remaining features of the plate 50, so the keys 80 are always in a predetermined angular position relative to the fluid flow openings 56, 58 and retainer-receiving aperture 55. Recess 90*a* and corresponding key 80*a* are aligned with a diameter passing through the hook 18. This configuration assists in centering the cartridge 14 relative to the bottom surface 13 of the head 12, ensuring accurate registration of the fluid flow openings 15, 17 in the head with the corresponding fluid flow openings in the cartridge 56, 58. Accurate centering of the cartridge 14 also ensures that the O-ring seals carried in the grooves 57, 59 on top of the plate 50 separate the unfiltered/dirty and filtered/clean sides of the filter assembly. Alternative patterns of keys may be created on key rings such as 82, rather than casting the keys into the plate (as shown in FIG. 32 below) or some other more expensive process. Keys also enable product information that may be present on the element to be oriented in the proper position relative to the installation on the vehicle or equipment. This information may contain, but is not limited to, a customer logo, installation instructions, etc.

FIGS. 15-19 illustrate an alternative "T" shaped retainer 18*a* and corresponding plate 50*a*. This retainer 18*a* has an eye 19 at its upper end and is engaged with a cam as previously described. In this embodiment, the arm 26 of the retainer 18*a* is substantially aligned with the longitudinal axis A-A of the cartridge 14 and retaining shoulders 27 extend to either side of the arm 26. A complementary cartridge includes a top plate 50*a* with a retainer receiving aperture 61 configured to receive the retaining shoulders 27 of the retainer 18*a* and the cartridge 14 is then rotated 90° to position the retaining shoulders 27 beneath a split keeper 30*a*. The keeper in this embodiment includes first and second keeper portions 30*a* positioned to either side of the retainer receiving aperture 61 and longitudinal axis. The keeper portions 30a have a concave configuration complementary to the convex shape of the retaining shoulders 27. FIGS. 15-18 do not show outlets other than the retainer receiving aperture 61, which may serve as a fluid outlet, assuming the retainer receiving aperture 61 permits sufficient flow. Alternatively, the plate 50a may be provided with outlets (not shown) other than the retainer receiving slot. The retainer receiving aperture 61 need not be in communication with the fluid flow paths through the assembly, as previously described. Since this embodiment requires rotation of the cartridge 14 relative to the head 12, the recesses (not shown) in the head corresponding to any keys on the top of the cartridge must have a corresponding arcuate configuration. To engage the cartridge 14 with the retainer 28a, keys extending from the top of the cartridge are aligned with corresponding arcuate recesses (not shown) in the head, the retainer 18a is inserted through the slot-shaped retainer receiving aperture 61 and rotated to position the shoulders 27 beneath the first and second keeper portions 30a. The cam is then moved from the "OFF" position to the "ON" position, retracting the retainer 18a and applying retention force to the plate 50a of the cartridge to retain the cartridge 14 to the head 12.

Figure 12:
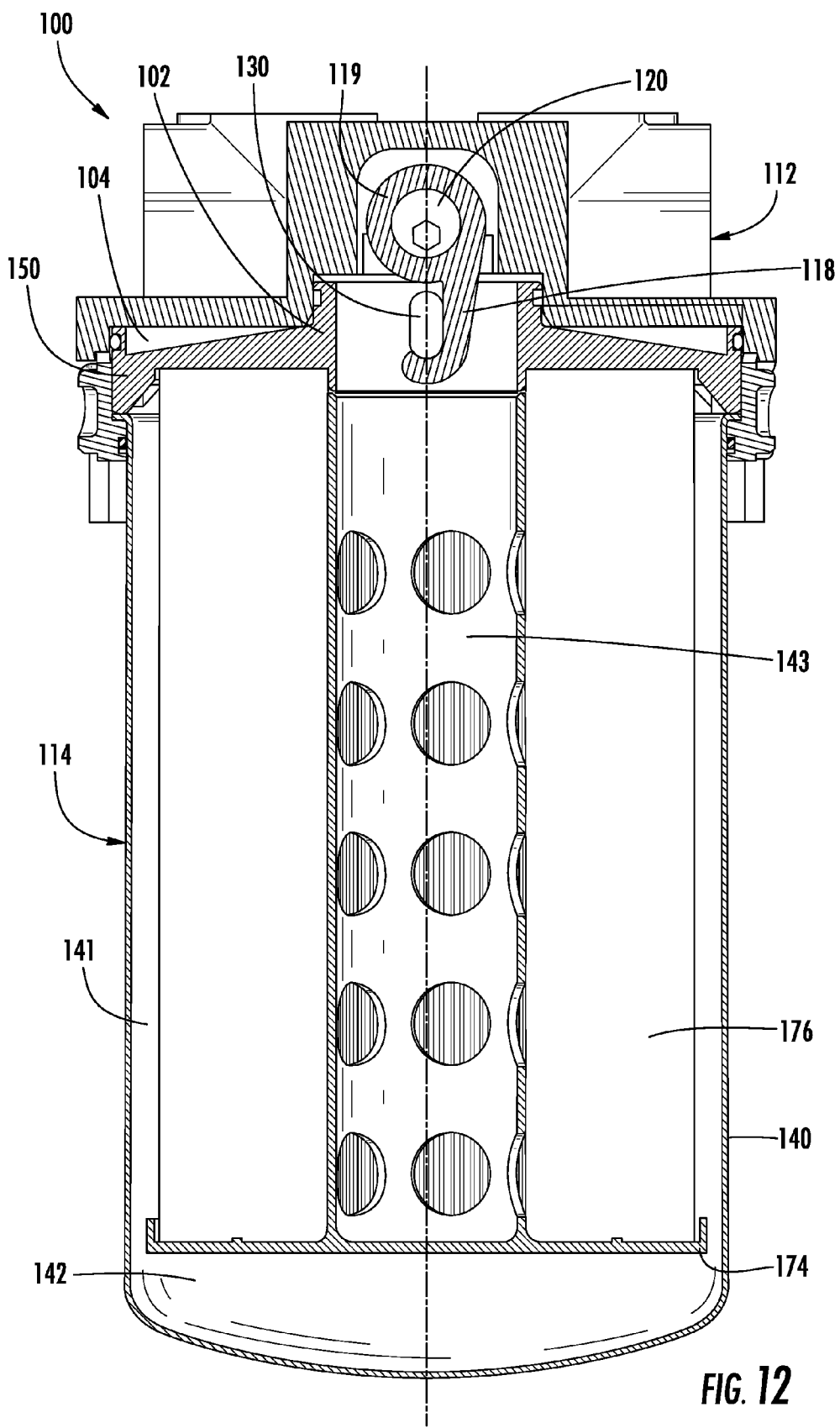
FIG. 12 is a sectional view through a second embodiment of a filter assembly according to aspects of the disclosure.
Figure 13:
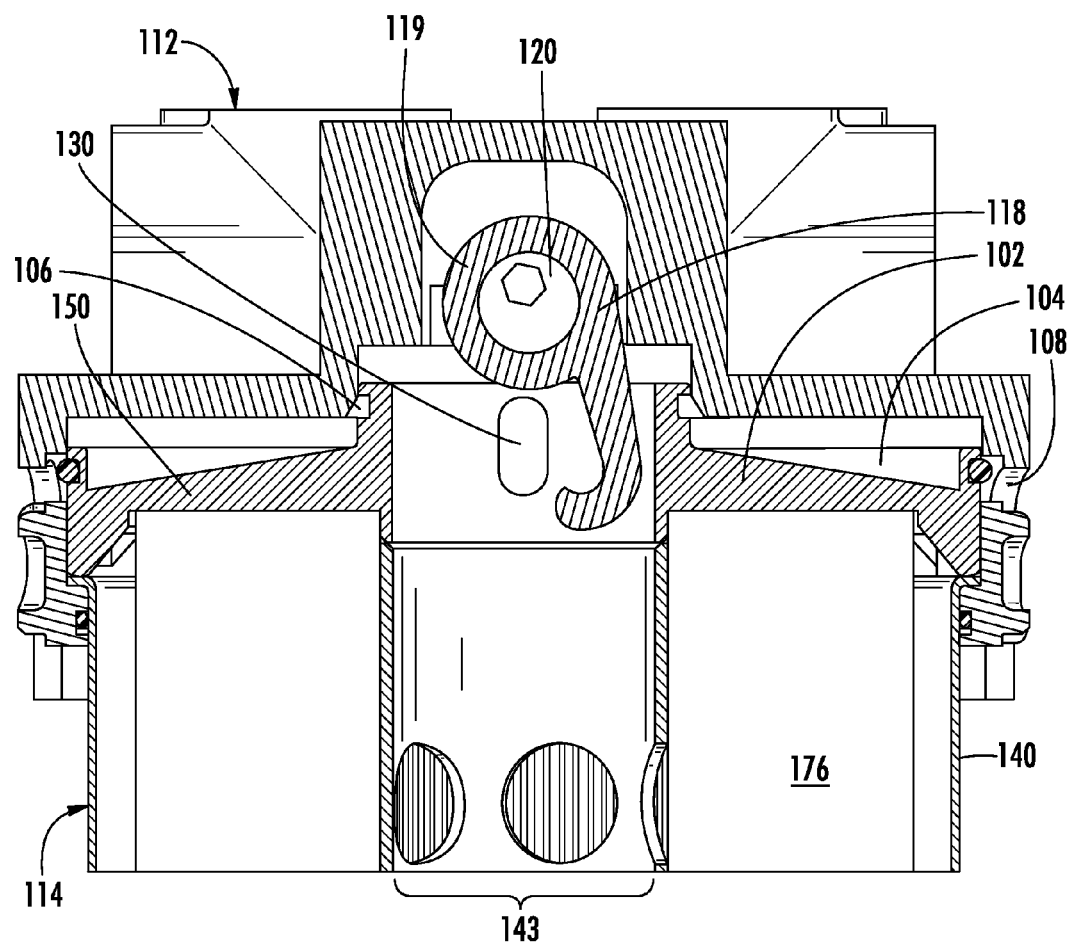
FIG. 13 is a sectional view through the filter assembly of FIG. 12, with the cartridge partially dismounted from the head.
Figure 14:
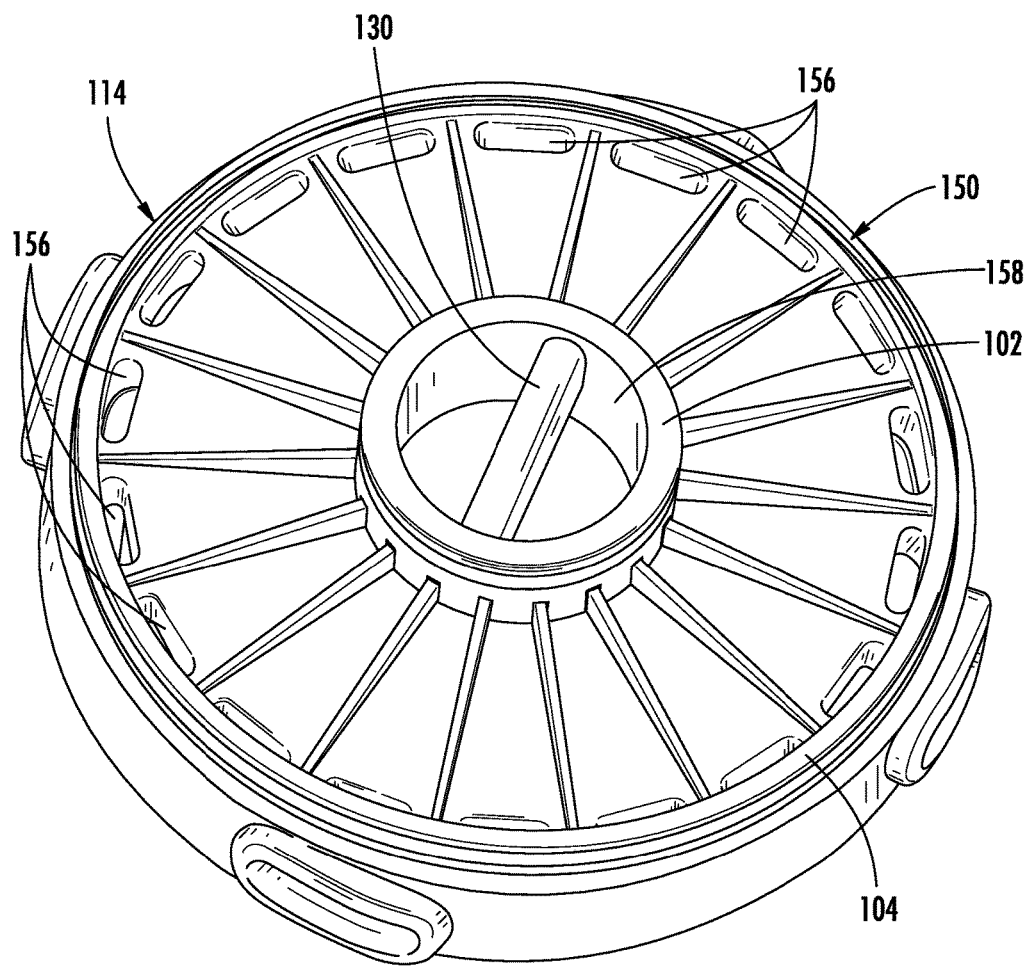
FIG. 14 is a top perspective view of the filter cartridge of the filter assembly of FIG. 12.
Figure 15:
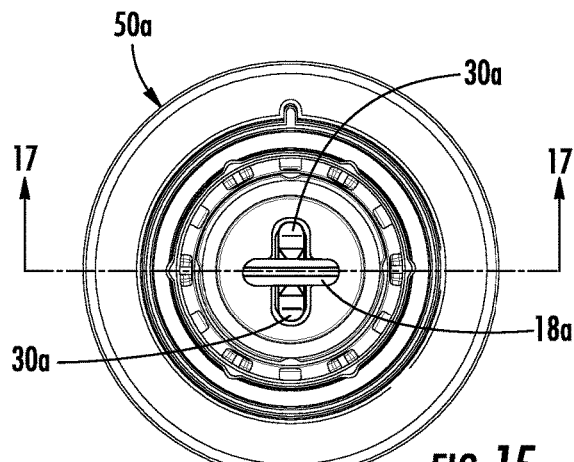
FIG. 15 is a top plan view of a filter cartridge top plate and alternative "T" shaped retainer.
Figure 16:
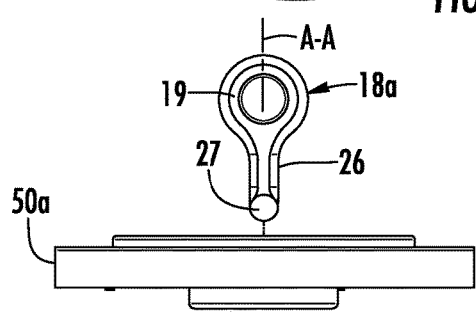
FIG. 16 is a side view of the top plate and "T" shaped retainer of FIG. 15.
Figure 17:
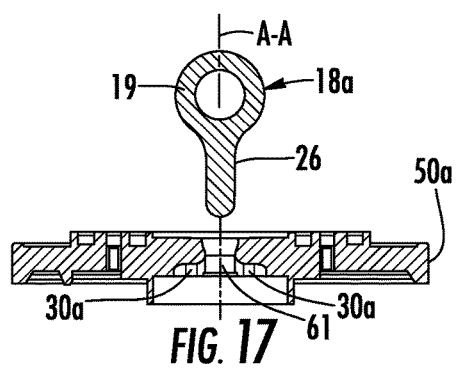
FIG. 17 is a sectional view through the top plate and "T" shaped retainer of FIG. 15, taken along line 17-17 thereof.
Figure 18:
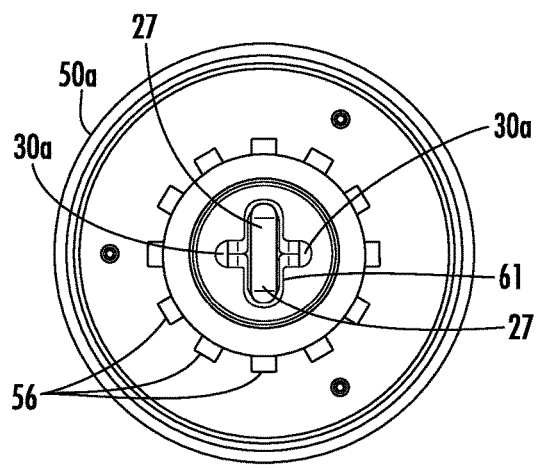
FIG. 18 is a bottom plan view of the top plate and "T" shaped retainer of FIG. 15.
Figure 19:
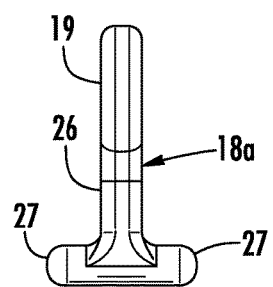
FIG. 19 is a side view of the "T" shaped retainer shown in FIGS. 16 and 17.
Figure 20:
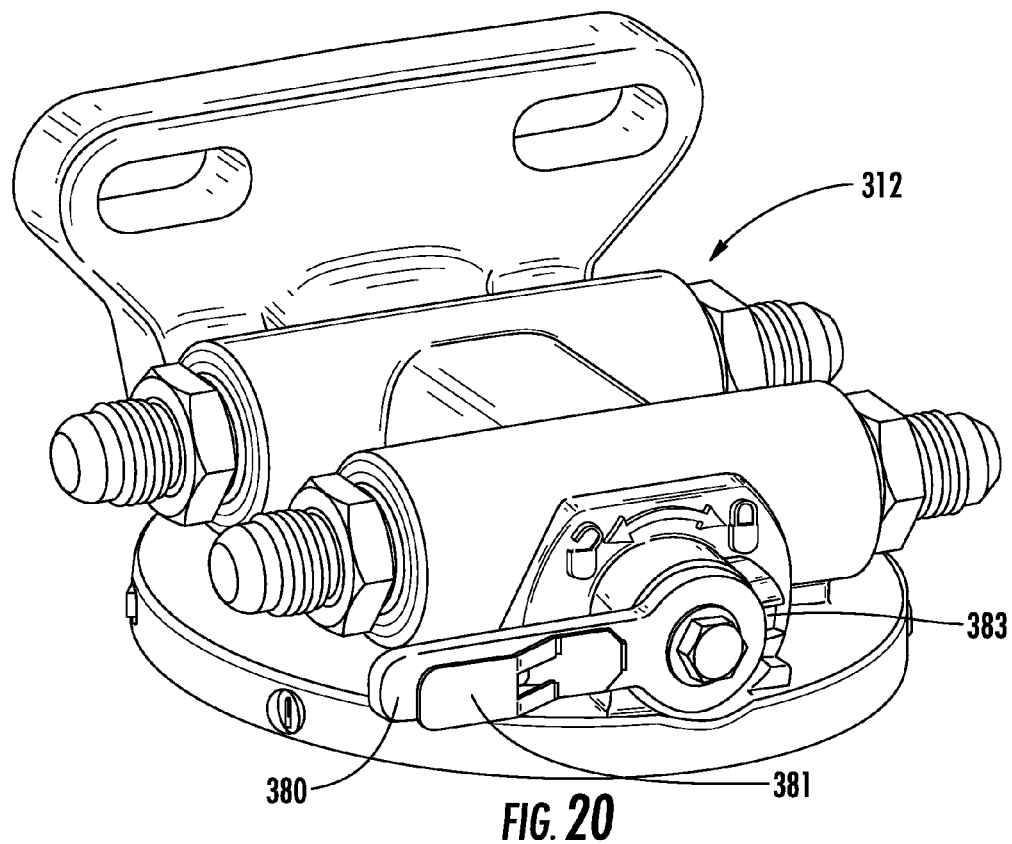
FIG. 20 is a perspective view of an embodiment of a head compatible with the disclosed cartridge retention mechanism, showing a hand operated release/engagement lever according to aspects of the disclosure.

FIGS. 12-14 illustrate an alternative embodiment of a filter assembly 100 including the draw latch retention system of the present disclosure. In most respects, the filter assembly 100 of this embodiment is similar in structure and function to the embodiments previously described, so the description will focus on where this embodiment differs from the embodiment of FIGS. 1-11 described above. As best seen in FIG. 13, the cartridge 114 includes a first axially projecting collar 102 surrounding the clean (central) region 143 and another collar 104 at the peripheral edge of the top plate 150. Each collar 102, 104 includes a seal carried in an outward facing annular groove 106, 108. These seals are compressed between the respective collars 102, 104 and a corresponding wall of the head 112 to form separate, sealed flow paths into and out of the cartridge 114. The top surface of the plate may be provided with keys to function in a manner similar to the keys discussed with respect to the embodiment of FIGS. 1-11 above. The keeper 130 is in the form of a bar traversing the outlet opening 158 at the center of the plate 150. As shown in FIG. 13, the hook 118 includes an eye 119 disposed around a cam 120. The hook 118, cam 120, eye 119 and keeper 130 all function in a manner similar to the corresponding components described with respect to the embodiment of FIGS. 1-11 above. In the embodiment of FIGS. 12-14, the filter media 176 is secured directly to the underside of the top plate 150 by glue, potting material or other means known in the art. A closed bottom end cap 174 is secured to the opposite end of the pleated cylinder of filter media 176 so that fluid must flow through the filter media 176 to move between the unfiltered (peripheral) region 141 and the clean (central) region 143 of the cavity 142 defined by the cartridge housing 140. As shown in FIG. 14, the top plate 150 defines an array of inlet openings 156 communicating with the unfiltered (peripheral) region 141 of the cavity 142. An outlet opening 158 is axially aligned with the filtered (central) region 143 of the cavity The embodiments illustrated in FIGS. 1-19 are generally cylindrical and have a circular interface between the cartridge and head. The disclosed embodiments employ a cylindrical, pleated media pack to separate unfiltered, dirty fuel in a peripheral region of the cartridge from clean, filtered fuel in a central region of the cartridge. Filter assemblies compatible with the draw latch retention system are not limited to the cylindrical shape, flow path, or circular interface between the cartridge and base illustrated with respect to these embodiments. The filter media configuration is not limited to a cylindrical configuration and may take the form of a flat panel of filter media, for example.

Figure 33:
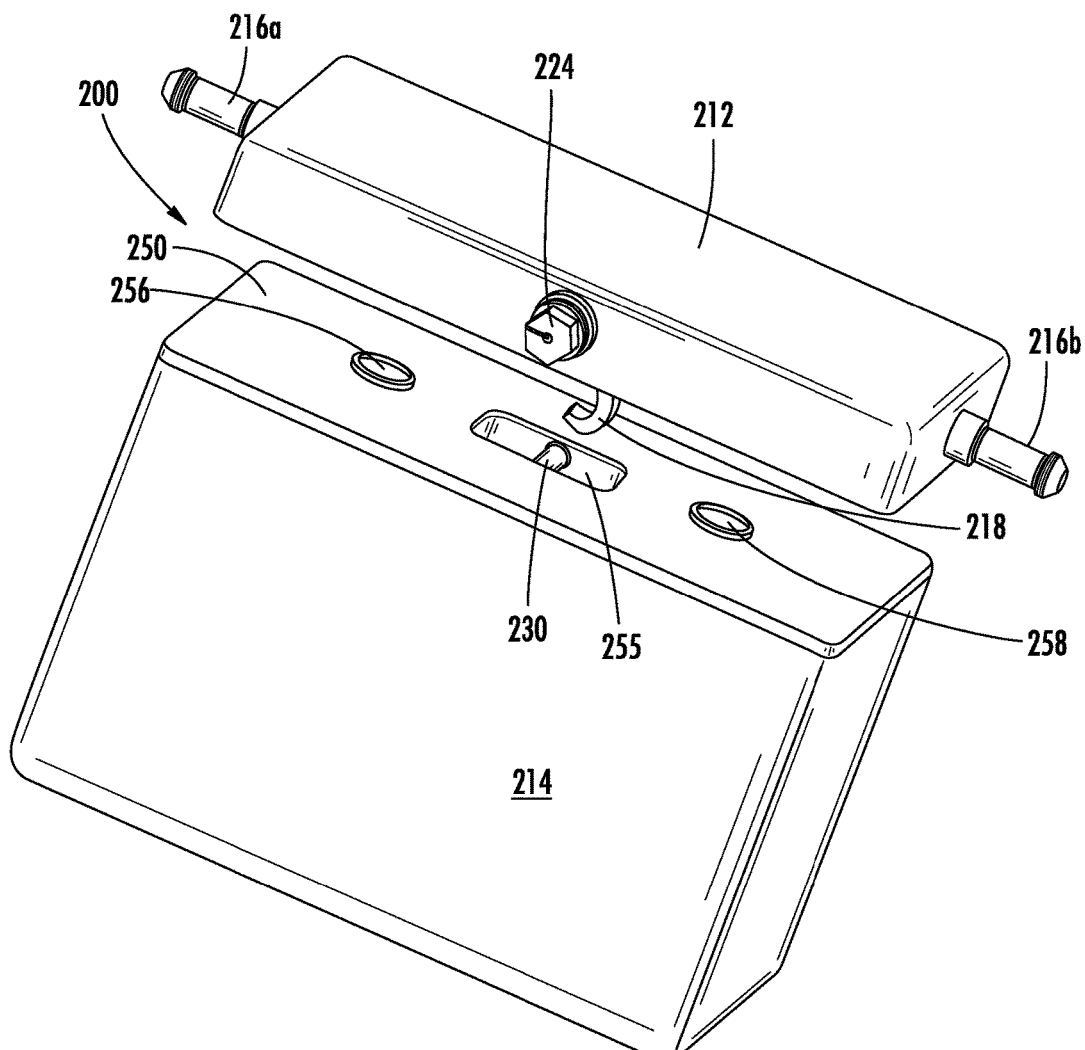
FIG. 33 is a perspective view of a non-round head and cartridge according to aspects of the disclosure.
Figure 34:
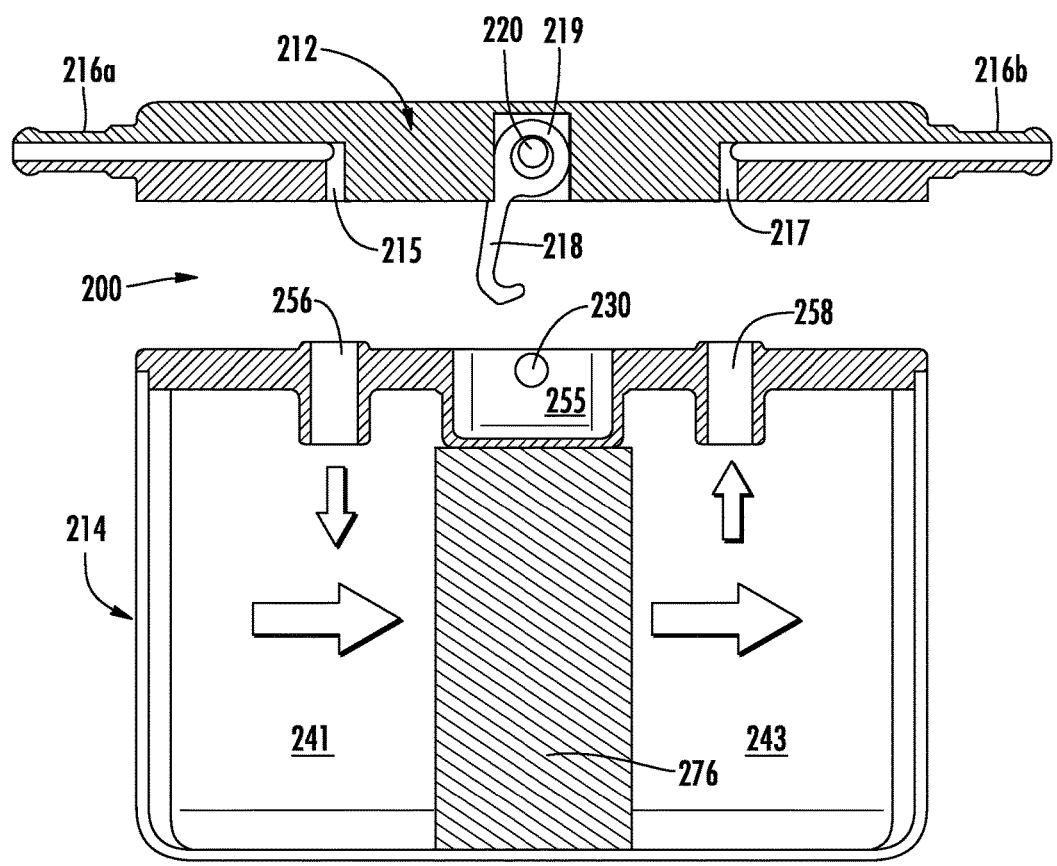
FIG. 34 is a sectional view through the head and non-round cartridge of FIG. 33.

FIGS. 33 and 34 illustrate a filter assembly 200 having a rectangular configuration. A rectangular head 212 includes fluid inlet 216a and fluid outlet 216b. The head 212 supports cam 220 and retainer hook 218. An eye 219 of the hook 218 engages the cam 220 and functions as described for the previous embodiments. A top plate 250 defines a cartridge inlet 256 and a cartridge outlet 258 aligned with corresponding fluid flow openings 215, 217. The media 276 is a pleated panel separating an unfiltered region 241 of the cartridge from a filtered region 243. The media 276 is joined to the inside of the housing by potting material or other means known in the art so that fluid must pass through the media 276 on its way through the filter assembly 200. The interface between a rectangular cartridge 214 and head 212 takes the form of a rectangular plate 250 closing one end of the cartridge 214 and a rectangular bottom surface of the filter head 212. The embodiment of FIGS. 33 and 34 illustrate a retainer receiving aperture 255 that is not in communication with any of the fluid flow passages. A bar-shaped keeper 230 is located in the retainer receiving aperture 255 for engagement by the retainer hook 218.

Figure 21:
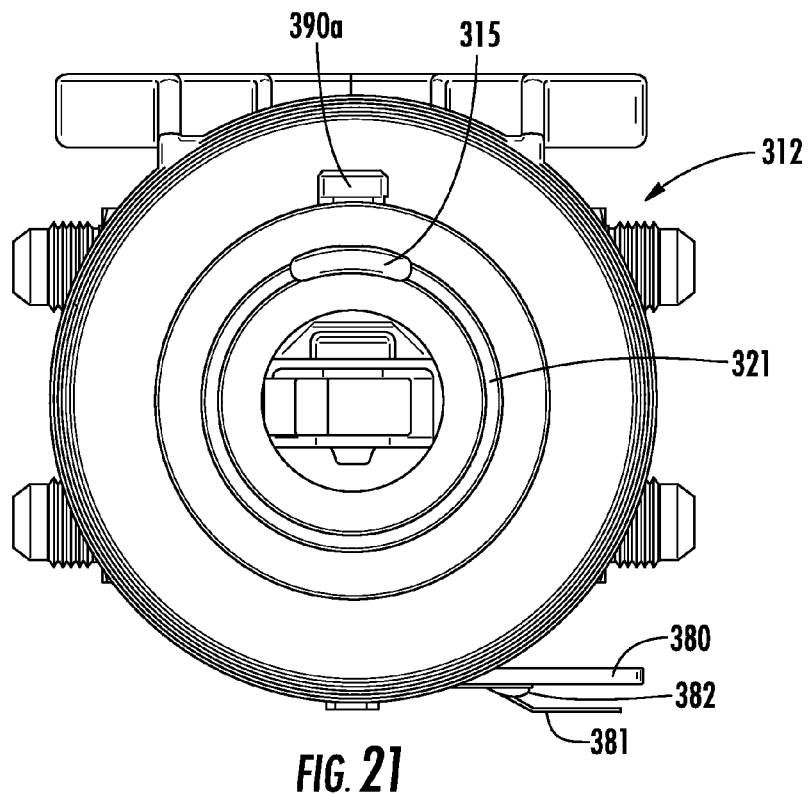
FIG. 21 is a bottom perspective view of the head of FIG. 20.
Figure 22:
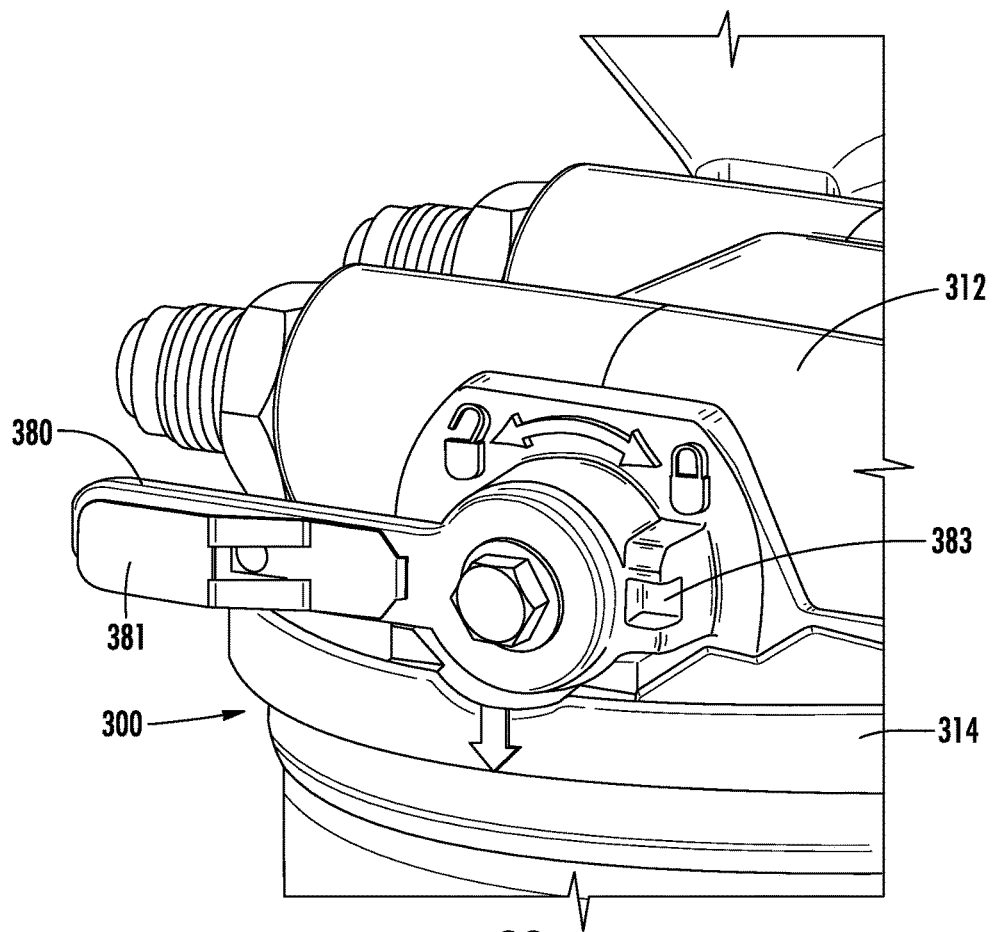
FIG. 22 is an enlarged partial perspective view of the head of FIG. 20.
Figure 23:
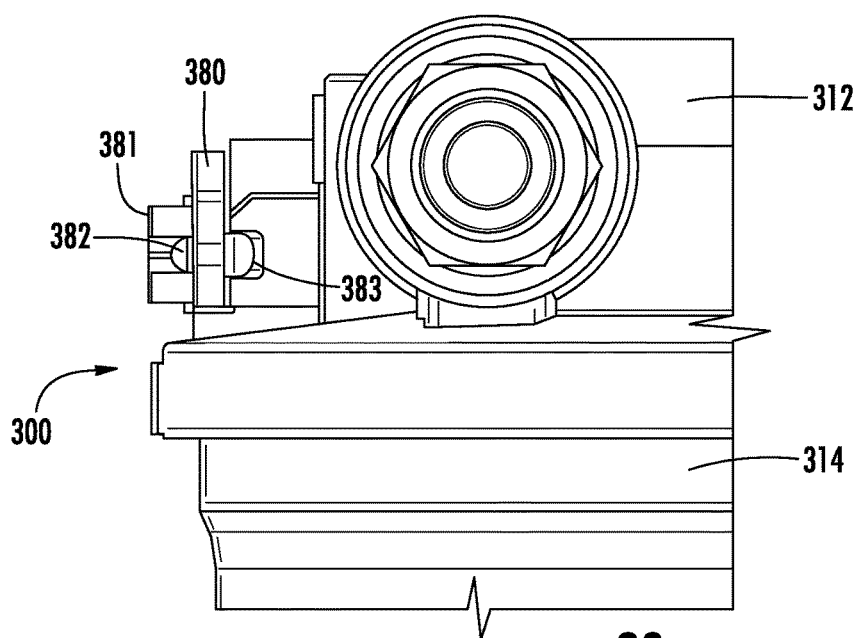
FIG. 23 is an enlarged partial side plan view of the head of FIG. 20.

FIGS. 20-26 illustrate an alternative embodiment of a filter assembly 300 employing a tool free cartridge retention mechanism. The filter assembly 300 of FIGS. 20-26 operates in a similar manner to the embodiments of FIGS. 1-19 and will be described with an emphasis on differences with previously discussed embodiments. A lever 380 is attached to the cam 320 and provided with a latch 381 to keep the lever 380 in the retained position as shown in FIGS. 26a and 26b. A limited frictional engagement between the cam 320 and the eye 319 of the retainer hook 318 is provided by a spring loaded ball 388 which engages a detent 322 on the cam 320. A set screw 384 biases spring 386 against the ball 388, so it engages the detent 322 to move the hook 318 counter clockwise from beneath the keeper 330 as the lever 380 is moved counterclockwise from the retained position shown in FIGS. 26a and 26b to the released position shown in FIGS. 24a and 24b. The lever latch mechanism includes a notch 383 on the head 312 which is engaged by the tip of the latch 381 to hold the lever 380 in the retained position as shown in FIG. 23. The latch 381 is compressed toward the lever 380 to release the tip from the notch 383 to permit counterclockwise rotation of the lever toward the released position. The latch mechanism 381, 383 prevents unintentional release of a mounted filter cartridge 314. FIG. 21 illustrates the filter head 312 from below, showing the fluid outlet 315 from the head and its associated circular flow channel 321. A "master" recess 390a corresponds to a "master" key (not shown) on the cartridge (as described with respect to other embodiments above) to ensure alignment of the cartridge 314 with fluid flow openings in the head 312.

Figure 27:
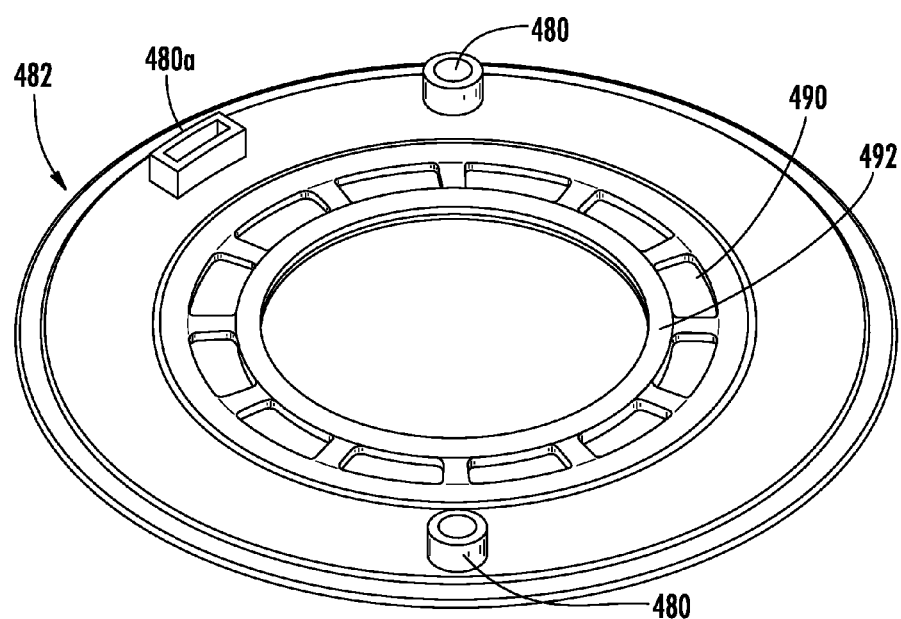
FIG. 27 is a perspective view of a key ring having integrated seal members according to aspects of the present disclosure.
Figure 28:
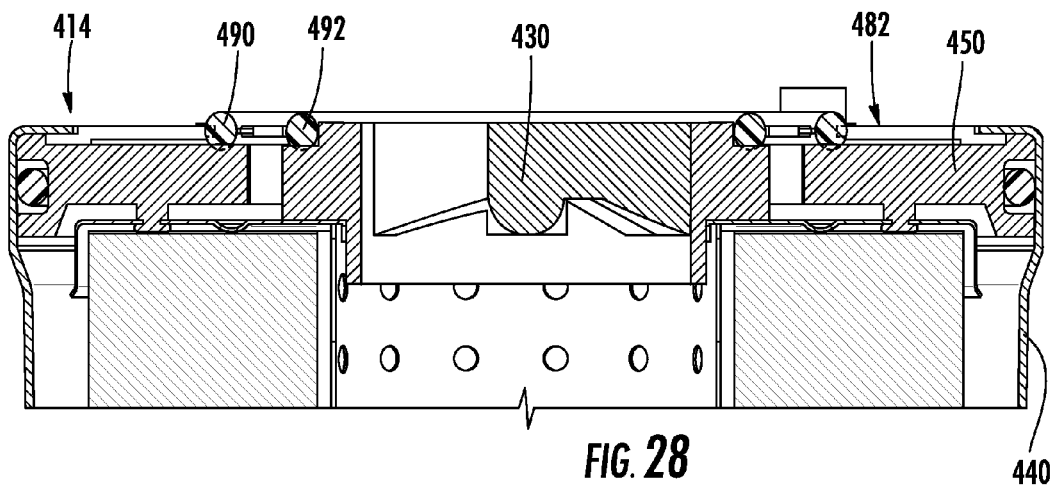
FIG. 28 is a sectional view through a filter cartridge incorporating the key plate of FIG. 27.

FIGS. 27 and 28 illustrate an alternative key ring 482 including keys 480, 480a and co-molded seals 490, 492. Key ring 482 may be molded from suitable plastic, for example nylon. Seals 490, 492 are molded around portions of the key ring 482 to create an integrated key ring 482 with seals integral to the plate. The keys include a "master" key 480a to fit with a corresponding "master" recess defined by the filter head. The "master" key has an extended lateral dimension to ensure alignment with the head and fluid openings therein. As shown in FIG. 28, the key ring 482 is trapped against the top plate 450 of the cartridge 414 by a formed upper lip of the cartridge housing 440. The key ring 482 may have features to ensure a single, installed orientation relative to the top plate 450 and cartridge housing 440. The top plate 450 of the cartridge 414 supports the keeper 430. The disclosed key ring 482 ensures that seals 490, 492 are securely retained to the cartridge during, manufacture, storage, shipping, and installation. Different key rings 482 may be used to code different filter cartridges for different filter assemblies.

FIG. 32 illustrates a top plate 50 in the form of a die cast metal part where the keys 80, 80a are molded with the plate 50. Other features, such as grooves 57, 59, for retention of seals are also molded with the plate 50. This alternative may be preferable to a separate key ring as shown in other embodiments.

Figure 29:
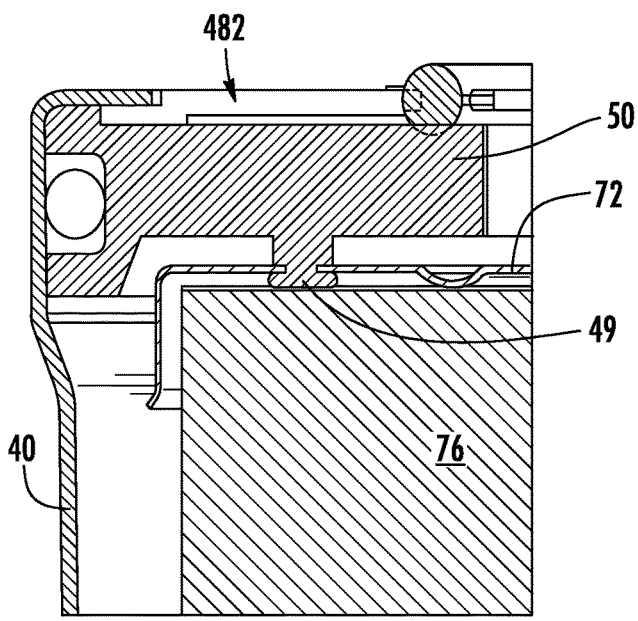
FIGS. 29-31 are sectional views through a filter cartridge and components thereof showing one example of an attachment used to secure an end cap of a filter element to a plate spanning one end of the cartridge.
Figure 30:
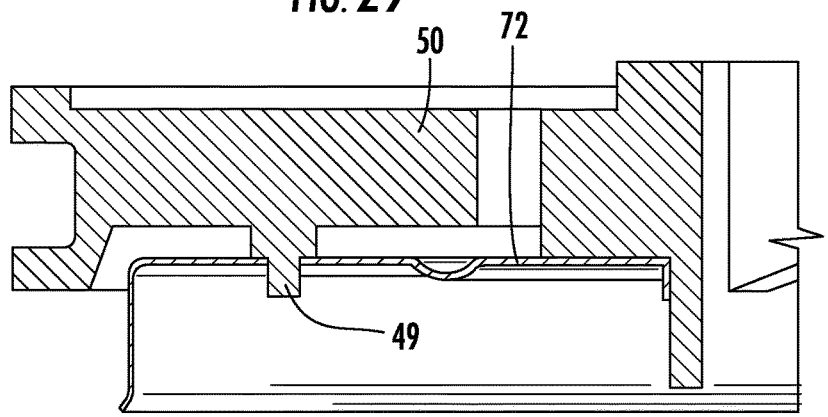
Figure 31:
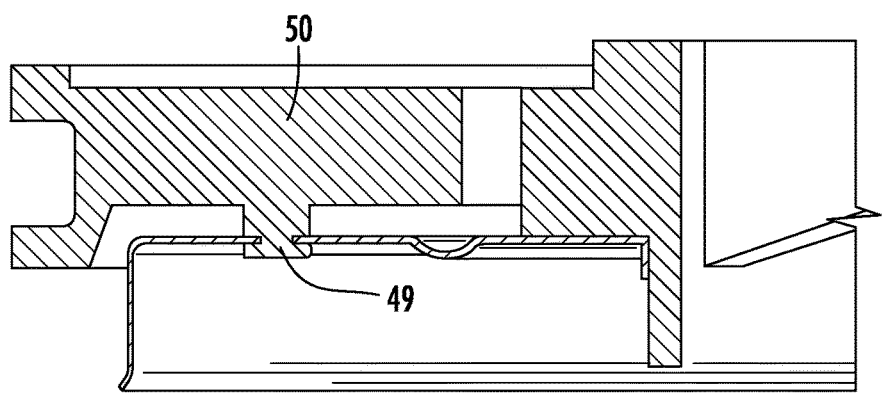

FIGS. 29-31 illustrate an alternative method for securing the filter media 76 within the cartridge housing 40. In this embodiment, top plate 50 includes a plurality of plate posts 49 which are received in openings in an upper end cap 72. The plate posts 49 are formed to retain the upper end cap 72 to the top plate 50. The plate posts 49 in this embodiment resemble a rivet and act as a fastener to secure the upper end cap 72 to the top plate. Other fasteners, such as screws may be employed to secure the upper end cap 72 to the top plate, as will occur to those skilled in the art. In this method of cartridge construction, the upper end cap 72 is secured to the top plate 50, then the filter media 76 is secured to the upper end cap by potting material as is known in the art. The assembled top plate 50 and media 76 are then secured to the cartridge housing 40 by deforming the upper rim or lip of the housing 40 over the top surface of the top plate 50. If a key ring such as key ring 482 is present, it is retained against the top surface of the cartridge by the formed upper rim of the housing 40 as shown in FIG. 29.

A significant advantage of the disclosed draw latch retention is that the cartridge can be removed and installed without rotation of the cartridge relative to the head. It is common for there to be little room in the vicinity of an installed filter assembly, making rotation of the cartridge relative to the base difficult or impossible. Examples of filter attachments that require rotation of the cartridge relative to the base are threaded "spin on" cartridges and bayonet connections. Such rotating filter/head connections tend to be associated with cylindrical filter elements or cartridges. In the case of a rectangular cartridge, rotation in a cramped installation may not be possible due to the shape of the cartridge. A draw latch attachment where the cartridge is drawn axially into engagement with the head also permits a wide variety of fluid flow opening and seal configurations. Flow openings may be defined by a tubular projection from the head or the cartridge and carry O-ring seals that will be compressed when the cartridge is mounted to the base.

References in this application to directions or relative position, such as "above," "below," "top," "bottom," "upper," "lower" and the like. These directions are for explanatory purposes only and should not be taken as limiting the described filter assemblies to any particular installed or functional attitude. The most common installed configuration is for the head to be mounted to a vertical wall or structure with the filter cartridge suspended below the head. The drawings illustrate this arrangement and the directional references are typically taken with respect to this installed orientation.

Preferred embodiments of the filter assembly are described for purposes of illustration and should not be read as a limitation on the disclosed concepts. Variations of those preferred embodiments may become apparent upon reading the foregoing description and the appended claims are intended to encompass all such variations.

What is claimed:

1. A filter cartridge comprising:
a housing defining a cavity and having a longitudinal axis extending through the center of said housing;
filter media disposed in said housing and separating said cavity into an unfiltered region and a filtered region, said filter media constructed so that fluid passes through the filter media to move between the unfiltered region and the filtered region;
a plate spanning a first end of said housing and defining first and second openings for fluid flow passages, said fluid flow passages in communication with the unfiltered region and the filtered region, respectively, said plate having a first surface facing axially away from said cavity and a second surface facing said cavity, said plate supporting a keeper and defining a retainer receiving aperture adjacent said keeper, said longitudinal axis passes through said keeper, and said aperture is offset from said longitudinal axis,
wherein said aperture permits access to said keeper from a location outside said cavity and said keeper is configured to receive a retention force directed toward said second surface and from a location within said cavity.

2. The filter cartridge of claim 1, wherein said keeper is integral with said top plate.

3. The filter cartridge of claim 1, wherein
said cartridge housing comprises a generally cylindrical can with a lip adjacent said first end to define an opening occupied by said plate, said lip being deformed radially inwardly to retain said plate to said housing.

4. The filter cartridge of claim 1, wherein said plate includes a plurality of axially extending keys defining a compatibility matrix on the first end of said cartridge.

5. The filter cartridge of claim 3, comprising a key ring trapped by said lip against said plate, said key ring comprising a plurality of axially extending keys defining a compatibility matrix on the first end of said cartridge.

6. The filter cartridge of claim 3, comprising a plastic plate trapped by said lip against said plate, said plastic plate including at least one seal integral with the plastic plate and arranged to separate the fluid inlet flow path from the fluid outlet flow path.

7. The filter cartridge of claim 4, wherein said plurality of axially extending keys includes at least one key positioned on a diameter of said plate passing through said keeper and aperture.

8. The filter cartridge of claim 1, wherein said filter media comprises a first open end cap adjacent said plate and a second closed end cap adjacent the second end of said housing, said first end cap secured to said plate by at least one fastener to maintain the position of said filter media within said housing.

9. The filter cartridge of claim 1, wherein said keeper has a convex surface facing said cavity.

10. A filter assembly comprising:
a head defining at least one fluid inlet and at least one fluid outlet communicating with a cartridge receptacle, said head including a retainer engaged with a shaft mounted eccentric, rotation of said shaft in a first direction withdraws the retainer toward the head and rotation of said shaft in a second direction extends the retainer from the head, said retainer including an arm extending from said eccentric to a distal end including at least one lateral projection;

a filter cartridge including a housing, a filter element positioned within said housing having filter media arranged to separate an interior volume of said cartridge into unfiltered and filtered regions, fluid passing through said filter media to move from said unfiltered to said filtered region, and a plate spanning a first end of said housing and engaged thereto, said plate defining at least one cartridge inlet opening for a fluid inlet flow path in communication with said unfiltered region, at least one cartridge outlet opening for a fluid outlet flow path in communication with said filtered region, a retainer receiving aperture and a keeper adjacent said aperture;

wherein said retainer extends through said aperture, said lateral projection engages said keeper and said shaft is rotated in said first direction to withdraw said retainer toward said head, applying a retention force to said keeper to secure said cartridge in said cartridge receptacle with said at least one fluid inlet in communication with said at least one fluid inlet flow path and said at least one fluid outlet in communication with said at least one fluid outlet flow path.

11. The filter assembly of claim 10, wherein said at least one lateral projection comprises a hook having a concave surface facing said head and said keeper comprises a convex surface facing said interior volume and complementary to said concave surface.

12. The filter assembly of claim 10, wherein said plate has a first surface facing said head, said plate first surface including at least one axially projecting key, said cartridge receptacle including a mating surface defining a recess complementary to said key, said key being received in said recess when cartridge is mounted to said head.

13. The filter assembly of claim 10, wherein said shaft is coupled with a valve, said valve closing upon rotation of said shaft in said second direction to release said cartridge and said valve opening when said shaft is rotated in said first direction to secure said cartridge to said head.

14. The filter assembly of claim 13, wherein said valve interrupts communication between said fluid inlet and said fluid inlet flow path, or between said fluid outlet and said fluid outlet flow path, or both.

* * * * *